United States Patent
Lim

(10) Patent No.: US 8,184,622 B2
(45) Date of Patent: May 22, 2012

(54) INTEGRATED INTERNET TELEPHONY SYSTEM AND SIGNALING METHOD THEREOF

(75) Inventor: Pyung-Bin Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 974 days.

(21) Appl. No.: 12/220,003

(22) Filed: Jul. 21, 2008

(65) Prior Publication Data

US 2009/0028138 A1   Jan. 29, 2009

(30) Foreign Application Priority Data

Jul. 23, 2007 (KR) .................. 10-2007-0073502
May 21, 2008 (KR) .................. 10-2008-0047131

(51) Int. Cl.
*H04L 12/66* (2006.01)

(52) U.S. Cl. .................. 370/352; 370/356; 370/466

(58) Field of Classification Search .................. None
See application file for complete search history.

(56) References Cited

U.S. PATENT DOCUMENTS

| 2004/0139230 | A1* | 7/2004 | Kim .................. 709/245 |
| 2005/0254482 | A1* | 11/2005 | Yeom .................. 370/352 |
| 2006/0193323 | A1 | 8/2006 | Lee |
| 2008/0159306 | A1* | 7/2008 | Pande et al. .................. 370/401 |

OTHER PUBLICATIONS

White Paper, "Sun StorEdge NAS IP Aliasing", Sun Microsystems, Jun. 2005, 8 pages.
European Search Report dated Jan. 16, 2009 in connection with European Patent Application No. EP 08 16 0805.

* cited by examiner

*Primary Examiner* — Chirag Shah
*Assistant Examiner* — Salvador E Rivas

(57) ABSTRACT

A VoIP network includes an integrated Internet telephony system having an all-in-one architecture in which an application layer gateway function, a signaling processing function and a media processing function are integrated. The integrated Internet telephony system performs ALG processing on a packet bound to a first address and processes a signaling message bound to a second address so as to set up a call session between an external SIP terminal connected to a public network and an internal SIP terminal connected to a private network, and performs media processing on an RTP packet based on a third address, the RTP packet exchanged through the call session. A SIP signaling gateway function, a media gateway function and SIP-ALG function are installed in one chip, and respective functions are allocated with different IP addresses by the application of a virtual interface and aliasing IP addresses.

26 Claims, 15 Drawing Sheets

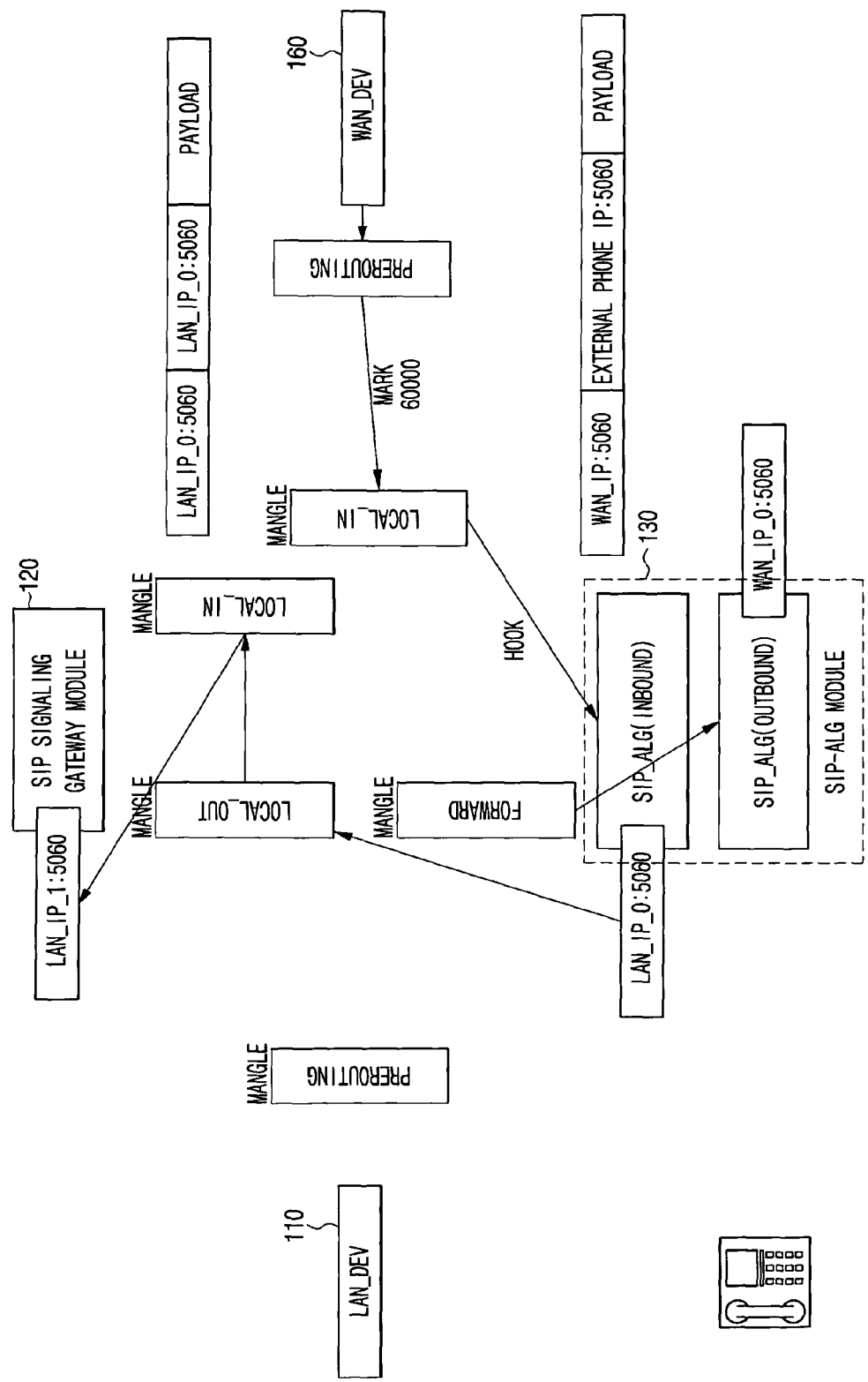

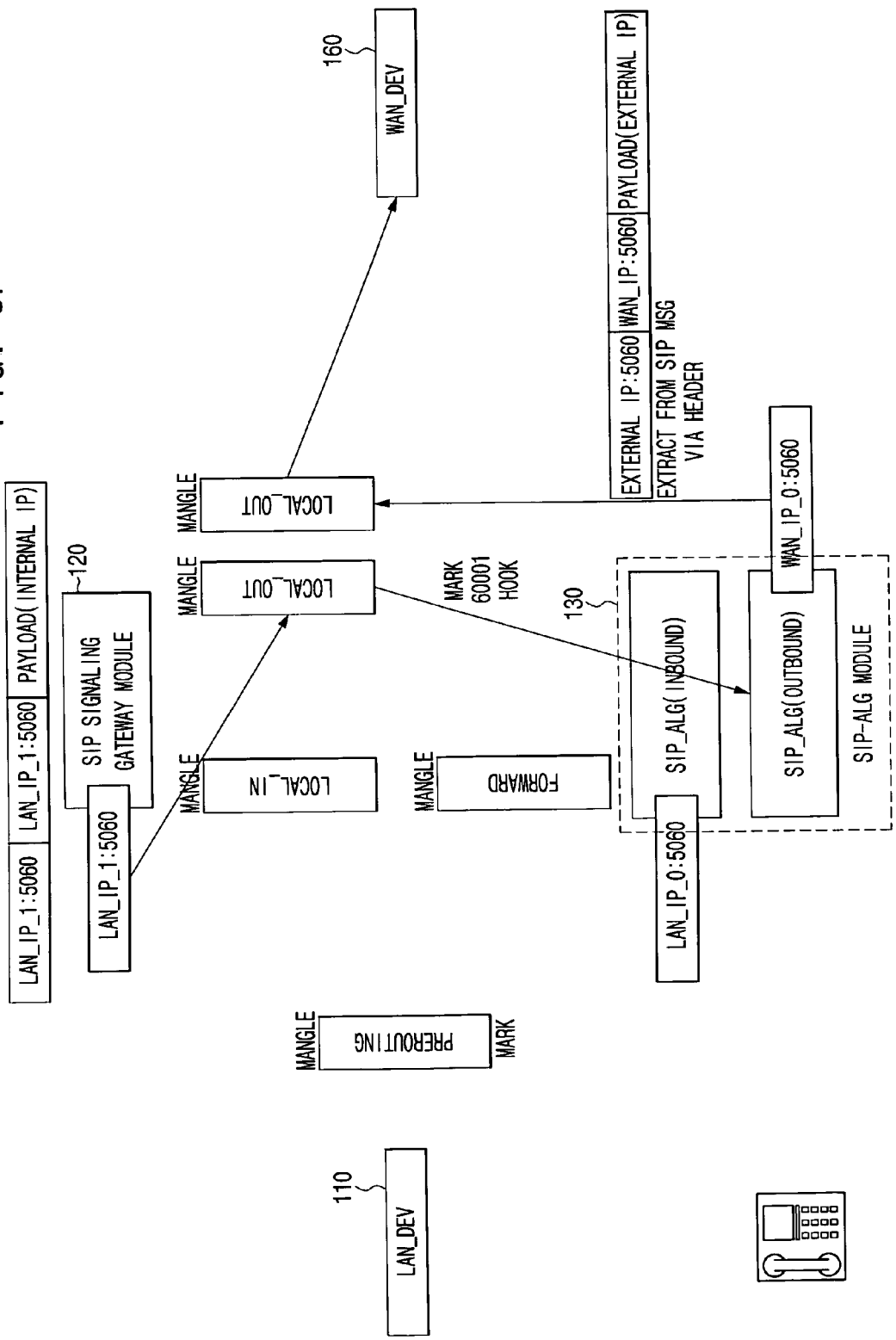

INTEGRATED INTERNET TELEPHONY SYSTEM AND SIGNALING METHOD THEREOF

CROSS-REFERENCE TO RELATED APPLICATION(S) AND CLAIM OF PRIORITY

This application makes reference to and claims all benefits accruing under 35 U.S.C. §119 from an application for "INTEGRATED INTERNET TELEPHONY SYSTEM AND SIGNALING METHOD THEREOF" earlier filed in the Korean Intellectual Property Office on Jul. 23, 2007 and May 21, 2008 and there duly assigned Serial No. 2007-73502 and 2008-47131.

TECHNICAL FIELD OF THE INVENTION

The present invention relates to an integrated Internet telephony system and a signaling method thereof, particularly, which can realize, in one chip such as a central processing unit (CPU), a session initiation protocol (SIP) signaling gateway function, a media gateway function and SIP-application layer gateway (SIP-ALG) function, which would otherwise be realized in separate pieces of equipment in the prior art, and also allocate respective functions with different IP addresses by the application of a virtual interface and aliasing IP addresses, so as to facilitate the construction of a Voice over Internet protocol (VoIP) network, minimize construction costs, and facilitate the maintenance, repair and management of the VoIP network.

BACKGROUND OF THE INVENTION

The Internet telephony or voice over Internet protocol (VoIP) is defined as communication technology that converts voice data into Internet protocol (IP) data packets, which can be transmitted through communication networks, in order to support voice conversation services not only through a telephone network but also over the Internet.

A major advantage of the VoIP and Internet technology is that they provide a telephone service by utilizing the existing IP networks in an untouched state, such that telephone users can be provided with long distance and international telephone services in Internet and intranet environments while they pay local call rate.

The VoIP was introduced by major equipment providers, such as Cisco, VocalTec, 3Com and NetSpeak, in an attempt to promote the use of ITU-T, H.323 and the like, which are standards for transmitting voice or sound using IP over the public Internet or through an intranet of a company. In order to promote the directory service standard, the VoIP forum allows users to locate other users. Furthermore, automatic call distribution and the use of touch-phone signals for voice mails are also enabled.

As a characteristic feature, the VoIP uses real time protocol (RTP) in order to support on-time arrival of packets in addition to its original IP function. If a common public network is used, the characteristics of best-effort services make it difficult to support quality of service (QoS) for voice communication. As a result, the VoIP services can be provided with higher quality when a private network managed by a separate enterprise or an Internet telephone service provider (ITSP) is used.

The application layer gateway (ALG) is provided by an application gateway or a router. According to the ALG, a conventional firewall or network address translator (NAT) can use several protocols in order to inspect packets transmitted between internal and external networks, and a verification process can be performed such that dynamically-allocated network resources can pass through the firewall or NAT.

That is, the ALG is a device that routes a message packet, dynamically entering from an external network resource, to a specific host of a security-maintained internal network through inspection and verification procedures.

In particular, the session initiation protocol-ALG (SIP-ALG) is technology designed to support communication between a SIP signaling gateway or a media gateway in an internal private network and a SIP proxy server or a SIP agent in an external public network.

FIG. 1 is an overview of the construction of a VoIP network that provides typical Internet telephony services.

As shown in FIG. 1, a private VoIP network using VoIP services generally includes an SIP signaling gateway 1, a media gateway 2, an internal SIP terminal 3 and an SIP-ALG router 4.

The SIP-ALG router 4 of the private VoIP network is connected to an external SIP proxy server 6 and external SIP terminals 7 and 8 through the Internet 5.

The SIP-ALG router 4 binds a SIP signaling message to a VoIP RTP stream that the SIP signaling gateway 1 or the media gateway 2 transmits. The SIP-ALG router 4 parses the bound packet, and then substitutes the private IP address of the packet with its own public IP address before routing the packet over the Internet.

Based on the ALG technology as described above, the SIP signaling gateway 1 and the media gateway 2 of the private VoIP network can communicate with the SIP proxy server 6 in the external network, which uses a public IP address, by transmitting/receiving packets to/from the SIP proxy server 6.

However, as shown in FIG. 1, a typical private VoIP network is constructed so that the SIP-ALG router 4, supporting the SIP-ALG function, is separated from the SIP signaling gateway 1 and the media gateway 2.

In this construction separated from the SIP signaling gateway 1 and the media gateway 2, the SIP-ALG router 4 overcomes the following problems of the private VoIP network.

When any one of the SIP agents 1 to 3 in the private VoIP network attempts to set up a session with an external user, following problems may occur. Firstly, the private IP address of the SIP agent 1 or 2, described in a SIP message or a Session Description Protocol (SDP), cannot be routed from outside. As a second problem, the NAT or the firewall does not allow traffics from outside to pass through unless they are permitted. Finally, traffic cannot be transmitted from inside to outside unless it is allowed by the firewall.

Due to these problems, the SIP agents 1 and 2 and the SIP terminal 3 inside the firewall cannot communicate with the external SIP proxy server 6 or the external SIP terminal 7 or 8.

Accordingly, the SIP-ALG router 4 is designed to solve the NAT- and firewall-related problems and to convert the private IP address into public IP address.

However, the SIP signaling gateway 1, the medial gateway 2 and the router 4 supporting the SIP-ALG functions are required to be separately purchased in order to operate the foregoing private VoIP network. Of course, a company or firm operating the private VoIP network has to separately maintain, repair and manage respective pieces of equipment.

Accordingly, it is difficult for a network operator, who has to manage several pieces of equipment, to easily manage the private VoIP network.

In the meantime, an integrated Internet telephony system having an all-in-one architecture in which SIP signaling, media gateway and SIP-ALG functions are integrated can be provided by realizing the SIP signaling gateway 1, the media gateway 2 and the SIP-ALG router 4 in one piece of equipment in order to facilitate the maintenance, repair and management of the equipment while minimizing construction costs of the private VoIP network.

Also, there is a problem in that the SIP signaling gateway 1, the media gateway 2 and the SIP-ALG router 4 are required to be allocated with different unique IP addresses while the integrated Internet telephony system uses only one IP address.

SUMMARY OF THE INVENTION

To address the above-discussed deficiencies of the prior art, it is a primary object of the present invention to solve the foregoing problems with the prior art, and therefore the present invention is directed to an integrated Internet telephony system and a signaling method thereof, which can simultaneously process, in one piece of equipment, a plurality of voice of Internet protocol (VoIP)-related functions, such as a session initiation protocol (SIP) signaling gateway, media gateway and session initiation protocol-application layer gateway (SIP-ALG) functions, which would otherwise be operated in separate pieces of equipment according to the prior art.

The present invention is also directed to an integrated Internet telephony system and a signaling method thereof, which can allocate respective parts such as a SIP signaling gateway, a media gateway and a SIP-ALG with different IP addresses in order to provide an Internet telephone service.

The present invention is further directed to an integrated Internet telephony system and a signaling method thereof, in which the SIP-ALG manages different address information of the SIP signaling gateway and the media gateway, such that a signaling packet and a real time protocol (RTP) packet, necessary for an Internet telephone service, can be transmitted to/received from the SIP signaling gateway and the media gateway.

According to an aspect of the invention, there is provided a voice of Internet protocol (VoIP) network comprising an integrated Internet telephony system having an all-in-one architecture in which an application layer gateway function, a signaling processing function and a media processing function are integrated. The integrated Internet telephony system performs application layer gateway (ALG) processing on a packet bound to a first address and processes a signaling message bound to a second address so as to set up a call session between an external session initiation protocol (SIP) terminal connected to a public network and an internal SIP terminal connected to a private network, and performs media processing on a real time protocol (RTP) packet based on a third address, the RTP packet exchanged through the call session.

The integrated Internet telephony system may include a first interface connected to the public network; a second interface connected to the private network; and a third interface connected to a different network from the second interface.

In the VoIP network, the first address is a private Internet protocol (IP) address of the second interface, the second address is in the same network as the first address, but is a different logical IP address from the first address, and the third address is in the same network as the third interface, but is a different logical IP address from the third interface.

In the VoIP network, the second address is an IP address aliased from the first address, and the third address is an IP address aliased from the address of the third interface.

The integrated Internet telephony system may modify private or public address information in a header field of the signaling message, which is bound to the first address, by mapping public or private address information; and may modify destination address information of the signaling message, which is bound to the first address, into the second address.

Further, the integrated Internet telephony system may manage address information of the internal SIP terminal, included in a session description protocol (SDP) part of the signaling message, using an inbound mapping table when the signaling message is going out from the private network to the public network; and may manage address information of the external SIP terminal included in the SDP part of the signaling message using an outbound mapping table when the signaling message is an in-coming message.

In addition, the integrated Internet telephony system may modify destination address information of an RTP packet by referring to the inbound mapping table when the RTP packet is an out-going packet, and modify the destination address information of the RTP packet by referring to the outbound mapping table when the RTP packet is an in-coming packet.

When the call session is set up, the internal SIP terminal or the external SIP terminal may exchange the RTP packet based on the destination address information included in the SDP part of the signaling message.

According to another aspect of the invention, there is provided an integrated Internet telephony system, which provides an Internet telephone service through a voice of Internet protocol (VoIP) network. The integrated Internet telephony system includes a local area network (LAN) interface connected to a private VoIP network using a first private Internet protocol (IP) address; a wide area network (WAN) interface connected to a public network using a public IP address; a virtual interface having a virtual private IP address; a session initiation protocol (SIP) signaling gateway module processing a signaling message, which is bound to a second private IP address, so as to set up a call session; a media gateway module connected to the virtual interface through a third private IP address so as to process a real time protocol (RTP) packet; and a session initiation protocol-application layer gateway (SIP-ALG) module modifying destination address information of the bounded signaling message and address information included in a session description protocol (SDP) part of the bounded signaling message.

The SIP-ALG module may modify destination address information of an out-going signaling message and private address information included in the SDP part of the out-going signaling message into public address information; and may modify destination address information of an in-coming signaling message into the first private IP address, and modifies public address information of an external SIP terminal included in the SDP part into private address information.

Further, the SIP-ALG module may include a SIP parser parsing the bound signaling message; a field modification module modifying address information in an IP header of the signaling message; an SDP processing module converting address information in the SDP part of the signaling message; and a SIP mapping table storing address information mapped to address information included in the signaling message when the signaling message is an in-coming or out-going message.

In addition, the SIP-ALG module may modify the destination address information of the signaling message into the first private IP address when the signaling message is an in-coming message, and modifies source address information of the in-coming signaling message into the first private IP address; may set the public IP address as destination address information in the SDP part of the signaling message; and may modify source address information of the signaling message into the public IP address when the signaling message is an out-going message, and modifies address information in the SDP part into an external IP address of an external terminal.

According to a further aspect of the invention, there is provided a signaling method of an integrated Internet telephony system, which has an all-in-one architecture in which a session initiation protocol-application layer gateway (SIP-ALG) function, a session initiation protocol (SIP) gateway function and a media processing function are integrated, and which includes a first interface connected to a private voice of Internet protocol (VoIP) network and a second interface connected to a public network. The method includes procedures of: adding, at the integrated Internet telephony system, a virtual interface belong to a different network from a first address; managing, at a first module in charge of the SIP-ALG function, address information included in a signaling message, which is bound to the first address, using a mapping table; modifying, at the first module, address information of the signaling message and address information included in a session description protocol (SDP) part of the signaling message; setting up, at a second module in charge of the SIP signaling gateway function, a call session based on the signaling message, which is bound to a second address; and exchanging, at an internal SIP terminal in the private VoIP network and an external terminal in the public network, a real time protocol (RTP) packet using a third address.

The signaling method may further include a procedure of performing, at a third module in charge of the media processing function, media processing on the RTP packet using the third address, which is connected to the virtual interface.

The procedure of managing, at the first module in charge of the SIP-ALG function, address information included in a signaling message, which is bound to the first address, using a mapping table, may include procedures of: managing private address information of the internal SIP terminal in the SDP part of the signaling message, which is going out from the private VoIP network to the public network, using an inbound mapping table; and managing public address information of the external SIP terminal in the SDP part of the signaling message, which is coming in, using an outbound mapping table.

The procedure of modifying, at the first module, address information of the signaling message and address information included in an SDP of the signaling message, may include procedures of: modifying the address information of the signaling message into corresponding private IP address information or public IP address information by referring to a respective one of the mapping tables; modifying destination source address information and source address information of the signaling message, which is coming in, from the public IP address into the first private IP address and from address information of the external SIP terminal into the first private IP address by referring to the inbound mapping table, and transmitting the signaling message to the internal SIP terminal; and modifying source address information of the SIP signaling message and source information in a payload field of the SIP signaling message, which is going out, into the public IP address information and external IP address of the external SIP terminal by referring to the outbound mapping table.

As set forth above, the invention can simultaneously realize, in one piece of equipment, a plurality of VoIP-related functions, such as a SIP signaling gateway function, a media gateway function and a SIP-ALG function, which would otherwise be operated in separate pieces of equipment according to the prior art. This, as a result, can facilitate the construction of a VoIP network, which provides an Internet telephone service, minimize construction costs of the VoIP network, and facilitate the maintenance, repair and management of the VoIP network.

Further, the SIP signaling gateway function, the media gateway function and SIP-ALG function are installed in one chip, such as central processing unit (CPU), and are allocated with different IP addresses by the application of a virtual interface and aliasing of IP addresses, such that a call session for an Internet telephone service between the SIP terminals can be set up and RTP packets can be exchanged even though the SIP signaling gateway function, the media gateway function and SIP-ALG function are all-in-one integrated.

Moreover, address information of a signaling message necessary for an Internet telephone service and an IP address included in an SDP part can be so managed that a call session can be set up between an internal SIP terminal in a private VoIP network such as a firewall and an external SIP terminal in a public network such as the Internet.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 7A and 7B are SIP mapping tables of the integrated Internet telephony system according to an embodiment of the invention, in which FIG. 7A shows an inbound mapping table and FIG. 7B shows an outbound mapping table;

FIGS. 9A to 9F are conceptual views illustrating SIP signaling message flows in the integrated Internet telephony system according to an embodiment of the invention.

DETAILED DESCRIPTION OF THE INVENTION

FIGS. 1 through 9F, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telephony system.

Hereinafter, an integrated Internet telephony system and a signaling method thereof according to the present invention will be described more fully with reference to the accompanying drawings, in which exemplary embodiments thereof are shown. In the following description, some functions or constructions will not be described in detail since they would obscure the invention in unnecessary detail.

In the following detailed description of the invention, a primary IP address, which is allocated to a piece of network equipment and is used for a SIP-ALG function, will be referred to as the "first address," and an address, which is aliased from the primary IP address and is used for a SIP signaling gateway function, will be referred to as the "second address." Further, an address, which is aliased from an IP address of a virtual interface and is used in a media gateway module, will be referred to as the "third address."

The exemplary embodiments of the invention will be described with respect to a case where an RTP packet exchanged through a call session includes voice data, but this is not intended to limit the invention. Rather, it can be equally applied to a case where the RTP packet includes other data, such as image data.

Figure 2:
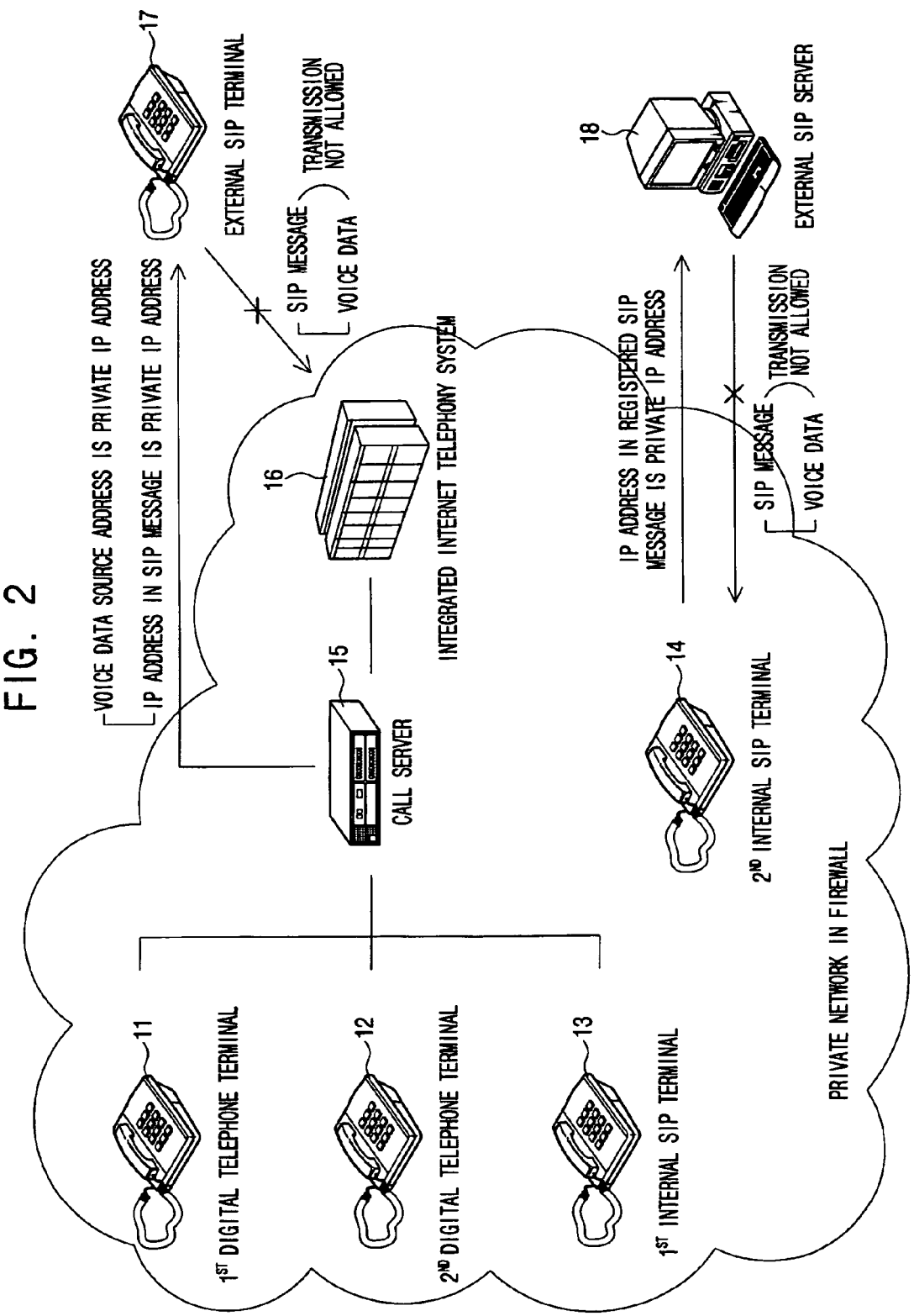
FIG. 2 is an overview illustrating the construction of a VoIP network including an integrated Internet telephony system, to which the invention is applicable.

FIG. 2 is an overview of the construction of a VoIP network including an integrated Internet telephony system, to which the invention is applicable.

The private VoIP network shown in FIG. 2 includes first and second digital telephone terminals 11 and 12, first and second internal SIP terminals 13 and 14, a call server 15 and an integrated Internet telephony system 16.

Herein, those agents such as the digital telephone terminals 11 and 12 and the internal SIP terminals 13 and 14, which are provided in the internal network of the private VoIP network in order to set up a telephony session for providing an Internet telephony service and thereby exchange an RTP packet including voice data, will be referred to as "internal SIP terminal," and those agents connected to the Internet will be referred to as "external SIP terminal."

Figure 1:
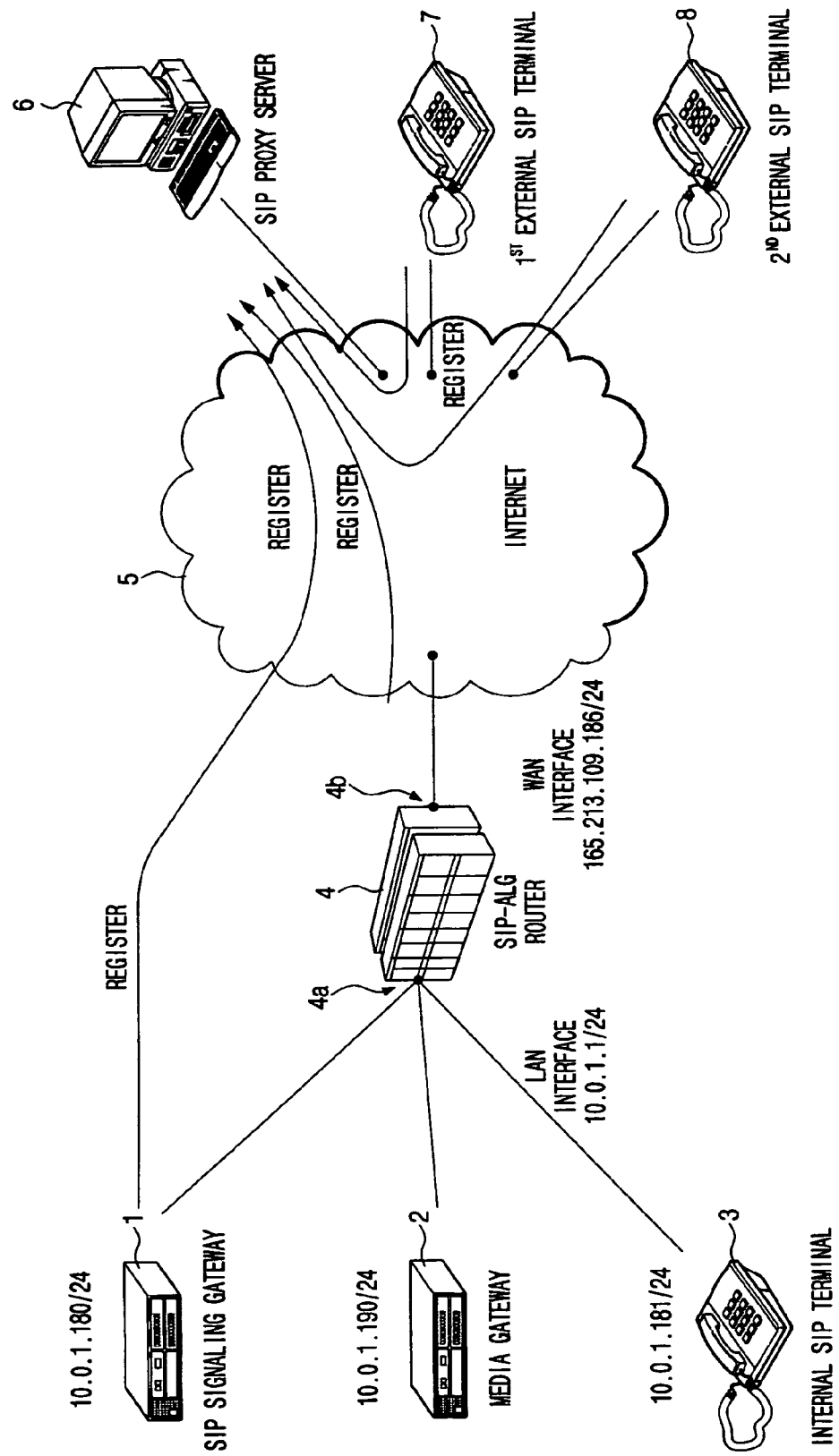
FIG. 1 is an overview illustrating the construction of a VoIP network that provides typical Internet telephony services.

The integrated Internet telephony system 16 has an all-in-one architecture in which those components of the typical VoIP network shown in FIG. 1, such as the SIP signaling gate 1, the media gateway 2 and the SIP-ALG router 4, operate on one chip (CPU).

The integrated Internet telephony system 16 shown in FIG. 2 is equipment, which is obtained by integrating those components shown in FIG. 1, such as the SIP signaling gateway 1, the media gateway 2 and the SIP-ALG router 4, without using a virtual interface 140 (see FIG. 4) of the invention.

The integrated Internet telephony system 16 as described above uses a single primary IP address. Since 5060 ports used by the SIP-ALG and the SIP signaling cannot be simultaneously bound to one IP address, both the SIP signaling function and the SIP-ALG function, which have to use different IP addresses, cannot be simultaneously enabled.

That is, the SIP signaling function and the SIP-ALG function have to use different unique IP addresses. As shown in FIG. 2, when the SIP signaling function and the SIP-ALG function are simply integrated into one piece of equipment, the integrated Internet telephony system can use only one IP address, so that both the SIP signaling function and the SIP-ALG function, which are required to use different IP addresses, cannot be simultaneously enabled.

Due to this problem, the private IP address of any one of the internal SIP terminals 13 to 14 or a call server 15 is inserted into the IP address field of a SIP message that the call server 15 transmits to an external SIP terminal 17. The private IP address of the call server 15 is inserted into the source IP address field of an RTP packet including voice data that the call server 15 transmits to the external SIP terminal 17.

In this case, the external SIP terminal 17 generates an SIP signaling message or an RTP packet by using the private IP address of the internal SIP terminal 13 to 14 or the call server 15, inserted in the SIP message or the RPT packet, as a destination address. However, since the private IP address cannot be routed through the Internet 103, the SIP signaling message or the RTP packet from the external SIP terminal 17 cannot be sent to the SIP signaling gateway or the internal SIP terminal 13 to 14, which take charge of the SIP signaling of the integrated Internet telephony system of the private VoIP network.

Similarly, supposing that the second internal SIP terminal 14 transmits a SIP register message, which requests registration from the external SIP server 18, a source IP address field in the SIP register message also has the private IP address of the second internal SIP terminal 14.

Since the destination IP address of the SIP register message is the public IP address of the external SIP server 18, the SIP register message is normally transmitted from the second internal SIP terminal 14 to the external SIP server 18.

However, since the external SIP server 18 is notified of merely the private IP address of the second SIP terminal 14, a SIP register response message and an RTP packet in response to the SIP register message according to the SIP register message cannot be sent to the private VoIP network.

Both the SIP signaling function and the SIP-ALG function cannot simultaneously operate in the integrated Internet telephony system since a SIP-ALG module 130 (see FIG. 4) of the integrated Internet telephony system 16 operates in the user datagram protocol (UDP) 5060 port, to which a SIP signaling gateway module 120 (see FIG. 4) of the integrated Internet telephony system 16, in charge of a SIP signaling function, binds a signaling message.

That is, one SIP standard port 5060 cannot be used by two application software modules (including the SIP signaling gateway module 120 and the SIP-ALG module 130).

As a result, the integrated Internet telephony system 16 of FIG. 2 cannot simultaneously perform the SIP-ALG function, the SIP signaling gateway function and the media gateway function.

Below, a description will be given of an integrated Internet telephony system of the invention, which can perform the SIP signaling gateway function, the media gateway function and the SIP-ALG function.

Figure 3:
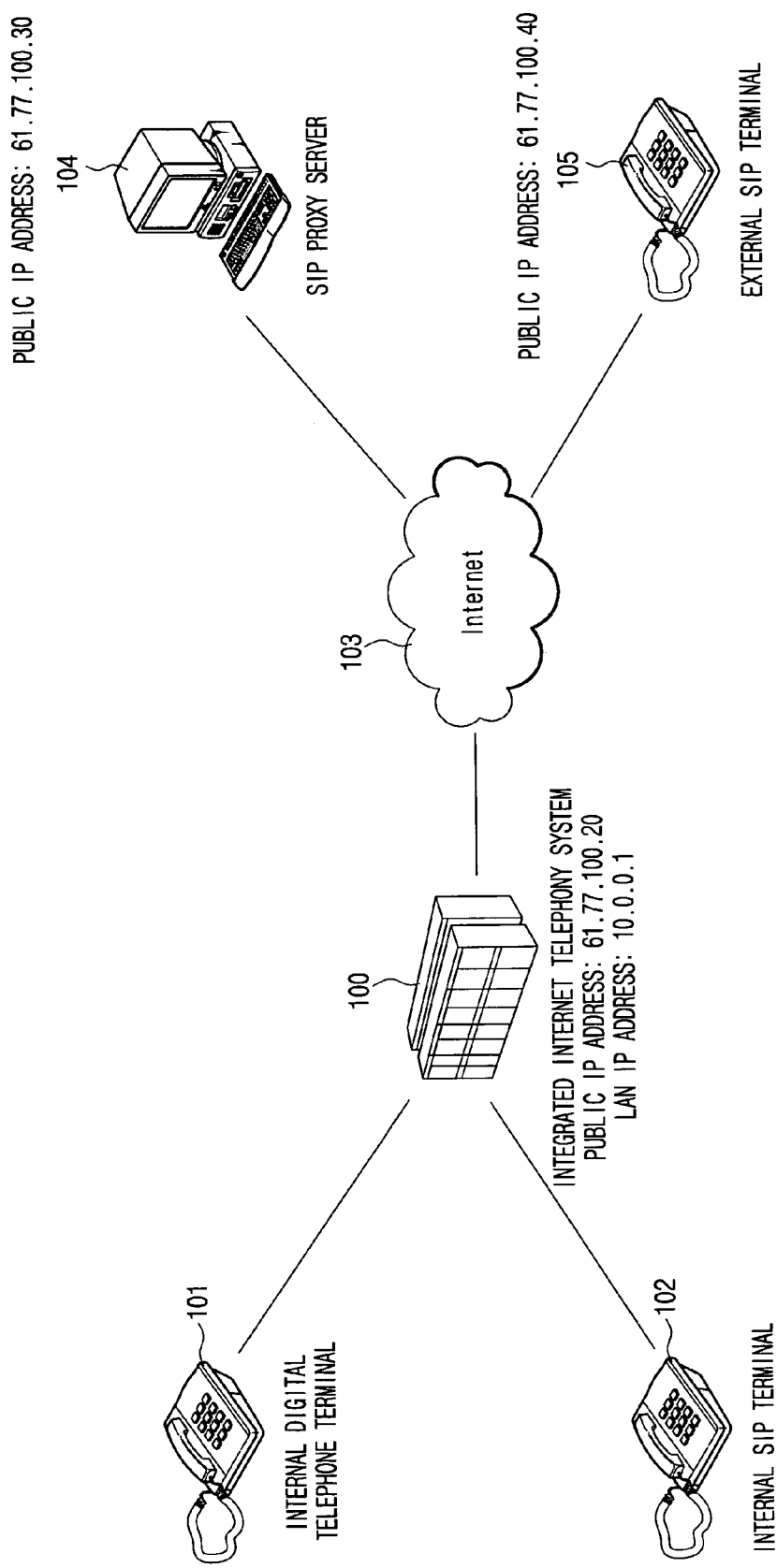
FIG. 3 is an overview illustrating the construction of a VoIP network including an integrated Internet telephony system according to an embodiment of the invention.

FIG. 3 is an overview of the construction of a VoIP network including an integrated Internet telephony system of the invention.

As shown in FIG. 3, the VoIP network includes internal SIP terminals (an internal digital telephone terminal 101 and an internal SIP terminal 102), an integrated Internet telephony system 100 and external SIP terminals (an external SIP proxy server 104 and an external SIP terminal 105) connected to the integrated Internet telephony system 100 via the Internet 103.

Referring to FIG. 3, supposing that a subnet mask be 255.255.255.0, the integrated Internet telephony system 100 has a public IP address (e.g., 61.77.100.20) and a private IP address (LAN IP address) (e.g., 10.0.0.1.).

Further, the external SIP proxy server 104 has a public IP address 61.77.100.30, and the external SIP terminal 105 has a public IP address 61.77.100.40.

The integrated Internet telephony system 100 is an integrated system that can simultaneously carry out not only the SIP-ALG function but also the SIP signaling gateway and media gateway functions.

Firstly, of several modules of the integrated Internet telephony system 100, the SIP-ALG module 130 (see FIG. 4) using a primary IP address (hereinafter, referred to as "first IP address") parses SIP signaling messages, which are sent from inside to outside of a private VoIP network or vice versa, and reconstructs the parsed messages (address modification and SDP part correction), in such a manner that the messages can be recognized by the external/internal SIP terminals (the internal digital telephone terminal, the internal SIP terminal, the SIP proxy server and the external SIP terminal), before transmitting the messages.

That is, the SIP-ALG module 130 parses a SIP signaling message such as a SIP request message or a SIP response message and modifies the address information (IP or port information) of the SIP request message or the SIP request message, such that the internal SIP terminal inside the private VoIP network (or the firewall) can recognize the message.

The SIP-ALG module 130 corrects a session description protocol (SDP) part of a voice data, which is transmitted on an RTP packet, and maintains and manages related information, such that the voice data can actually be sent to the internal SIP terminal 101 or 102.

The integrated Internet telephony system 100 of FIG. 3, which is proposed by the invention in order to overcome the problem occurring in the integrated Internet telephony system of FIG. 2, enables the SIP-ALG module 130 (see FIG. 4), the SIP signaling gateway module 120 (see FIG. 4) and a media gateway module 150 (see FIG. 4) to use different address information by using the virtual interface 140 (see FIG. 4) and alias IP address technology.

Describing in more detail, the primary IP address allocated to the CPU of the integrated Internet telephony system 100 is set (as a first address) to be used by the SIP-ALG module 130, and a virtual IP address (hereinafter, referred to as "second IP address") is allocated by an alias method so as to be used by the SIP signaling gateway module 120.

In addition to a local area network (LAN) interface 110 connected to the internal network (private VoIP network) and a wide area network (WAN) interface 160 connected to the Internet 103, the integrated Internet telephony system 100 further includes the virtual interface 140, through which the media gateway module 150 processing RTP packets can exchange the RTP packets.

The integrated Internet telephony system 100 also enables the media gateway module 150 to use a third address, which is aliased from the address information of the virtual interface 140.

Thus, the SIP-ALG module 130 binds a SIP signaling message to the first address, the SIP signaling gateway module 120 binds a SIP signaling message to the second address, and the media gateway module 150 exchanges an RTP packet using the third address.

In the integrated Internet telephony system 100 proposed by the invention, the SIP-ALG module 130, the SIP signaling gateway module 120 and the media gateway module 150 use different address information, and thus they can operate even if they are installed in one CPU of the integrated system.

While a description is given of a case in which unique IP addresses, different from the IP address of the SIP-ALG module 130, are allocated (given) respectively to the SIP signaling gateway module 120 and the media gateway module 150 by an alias addressing method in such a manner that the SIP-ALG module 130, the SIP signaling gateway module 120 and the media gateway module 150 use different IP addresses, different IP addresses can be allocated respectively to the SIP-ALG module 130, the SIP signaling gateway module 120 and the media gateway module 150 by a different address allocation method.

For the operation of the media gateway module 150, the integrated Internet telephony system 100 additionally designates a virtual interface. After that, the media gateway module 150 uses an alias IP address belonging to the same network as the virtual interface 140 (hereinafter, referred to as "third address"). That is, the media gateway module 150 processes an RTP packet using the third address, which is aliased from the IP address allocated to the virtual interface 140.

As a result, the integrated Internet telephony system 100 can perform all the operations of the SIP signaling gateway 1, the media gateway 2 and the SIP-ALG router 4 shown in FIG. 1 using the virtual interface 140 and the added alias IP address. As such, the respective pieces of equipment for providing an Internet telephony service can be implemented as one integrated piece of equipment, to thereby facilitate the construction of a VoIP network, minimize construction costs of the VoIP network, and facilitate the maintenance, repair and management of the VoIP network.

Below, a description will be given of a method of adding the virtual interface 140 and a method of allocating an alias IP address in the integrated Internet telephone system 100 of the invention.

Figure 4:
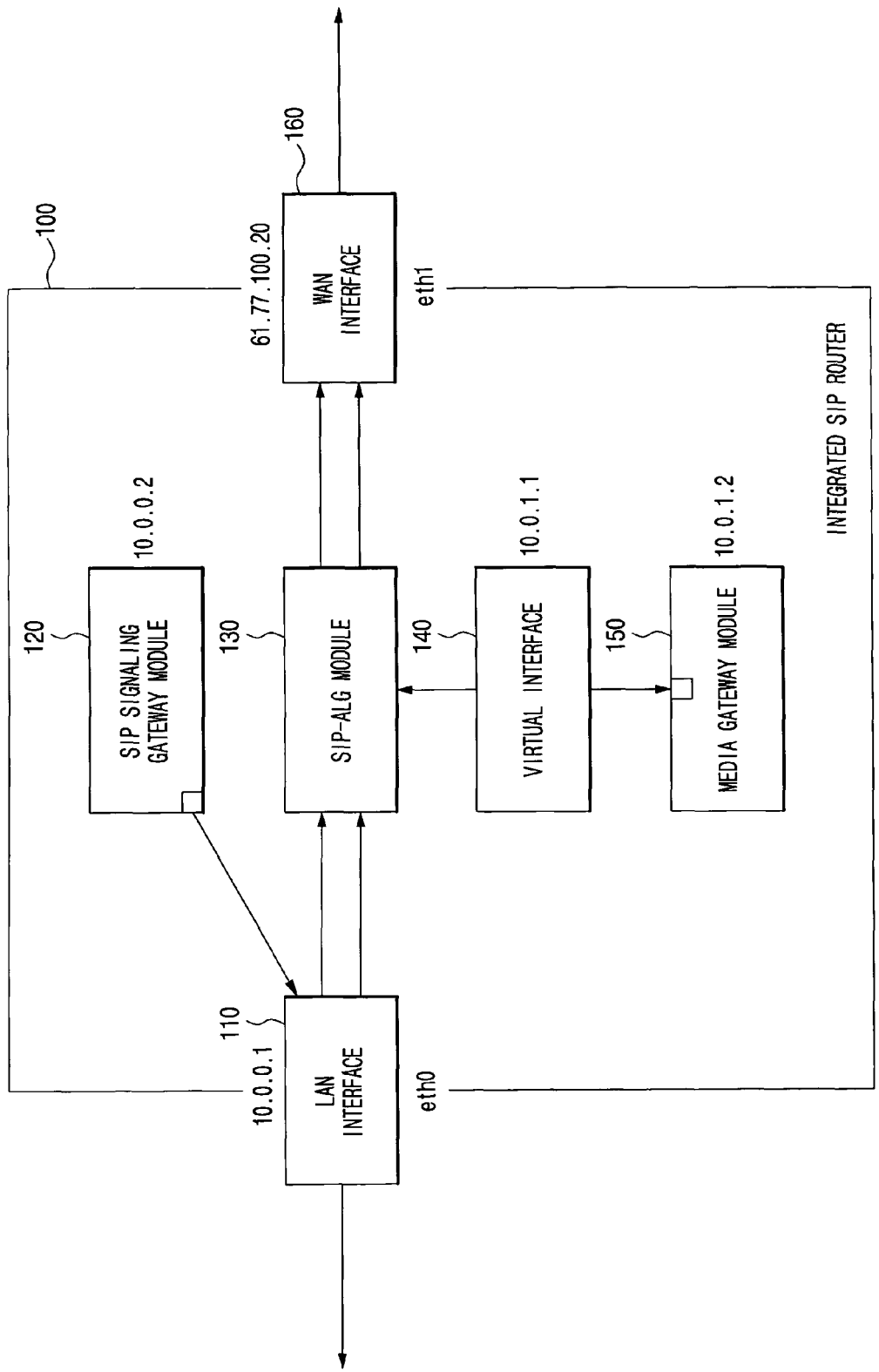
FIG. 4 is a block diagram illustrating an exemplary embodiment of the integrated Internet telephony system according to an embodiment of the invention.

FIG. 4 is a block diagram illustrating an embodiment of the integrated Internet telephony system according to the invention.

Referring to FIG. 4, the integrated Internet telephony system 100 is realized on one chip (CPU), in which the SIP-ALG module 130, the SIP signaling gateway module 120 and the media gateway module 150 are all-in-one integrated. Here, the SIP-ALG module 130 manages a SIP-ALG function, the SIP signaling gateway module 120 processes a SIP signaling message to set up a call session for an Internet telephone service, and the media gateway module 150 processes an RTP packet including voice data.

As such, the SIP-ALG module 130, the SIP signaling gateway module 120 and the media gateway module 150 can be realized as software function blocks on one chip.

Further, the integrated Internet telephony system 100 includes the LAN interface 110, the WAN interface 160 and the virtual interface 140. Here, the LAN interface 110 manages data transmission to/from the private VoIP network, the WAN interface 160 manages to transmit and receive data (e.g., SIP signaling messages and RTP packets) through the Internet, and the virtual interface module 140 is added to allow the media gateway module 150 to transmit and receive the RTP packets.

Below, a description will be given of IP addresses allocated to respective interfaces 110, 140 and 160.

As shown in FIG. 4, the IP address (public IP address) of the WAN interface 160 is 61.77.100.20. Since the WAN interface 160 interworks with the Internet 103 as a public network, the address 61.77.100.20 is a public IP address.

The IP address of the LAN interface 110 is 10.0.0.1. Since the LAN interface 110 interworks with a private network, such as a private VoIP network, the IP address 10.0.0.1 is a private IP address.

The public IP address and the private IP address of the integrated Internet telephony system 100 correspond respectively to the IP address of the WAN interface 160 and the IP address of the LAN interface 110. Thus, the public IP address of the integrated Internet telephony system 100 is 61.77.100.20, and the private IP address of the integrated Internet telephony system 100 is 10.0.0.1.

The integrated Internet telephony system 100 further includes the virtual interface 140, which has a private IP address different from the private IP address of the LAN interface 110. For example, the private IP address of the virtual interface 140 can be 10.0.1.1.

Supposing the subnet mask of the virtual interface 140 be 255.255.255.0, the virtual interface 140 is an interface that belongs to a different network from the WAN interface 160 or the LAN interface 110.

The media gateway module 150 can transmit and receive an RTP packet through the virtual interface 140 only when it is in the same network as the virtual interface 140. Accordingly, the media gateway module 150 uses the third address (e.g., 10.0.1.2) aliased from the IP address of the virtual interface 140.

The private IP address of the SIP signaling gateway module 120 is 10.0.0.2, which is aliased, for example, from the private IP address of the integrated Internet telephony system 100, particularly, the private IP address of the LAN interface 110.

The integrated Internet telephony system 100 has not only the primary IP address 10.0.0.1 but also 10.0.0.2 and 10.0.1.1, which are the private IP address of the SIP signaling gateway module 120 and the private IP address of the virtual interface 140, respectively, in which the SIP signaling gateway module 120 uses the private IP address aliased from the private IP address that the SIP-ALG module 130 uses (i.e., the second address), and the media gateway module 150 uses the private IP address aliased from the private IP address of the virtual interface 140 (i.e., the third address).

According to the invention, one physical piece of equipment (the integrated Internet telephony system 100) can have a plurality of logical IP addresses (e.g., 10.0.0.2 and 10.0.1.2), and an alias IP address method is applied as an example of adding a plurality of logical IP addresses.

The SIP signaling gateway module 120 uses the IP address 10.0.0.2, which is aliased from the private IP address 10.0.0.1 of the LAN interface 110, and the SIP signaling gateway module 120 can set the private IP address 10.0.0.1 of the LAN interface 110 as a default gateway address.

As such, when the default gateway address of the SIP signaling gateway module 120 is set as the private IP address of the LAN interface 110, a SIP signaling message generated by the SIP signaling gateway module 120 is forwarded to the LAN interface 110, and is then routed to an external SIP terminal through the SIP-ALG module 130 and the WAN interface 160.

The integrated Internet telephony system 100 additionally sets the virtual interface 140 in addition to the LAN interface 110 for the purpose of the operation of the media gateway module 150.

The integrated Internet telephony system 100 of the embodiment shown in FIG. 4 illustrates an exemplary case in which the virtual interface 140 having the private IP address 10.0.1.1 is added, and the media gateway module 150 uses the private IP address 10.0.1.2 aliased from the private IP address of the added virtual interface 140.

The SIP-ALG module 130 processes the ALG function by binding the SIP signaling message through the public IP address 61.77.100.20 and the private IP address 10.0.0.1 of the integrated Internet telephony system 100.

In order to bind the SIP signaling message, the SIP-ALG module 130 monitors the 5060 port (i.e., the port of the SIP signaling message, which is generally defined in the SIP).

Further, the SIP-ALG module 130 acquires all the private IP addresses used in the integrated Internet telephony system 100, such as the private IP address of the SIP signaling gateway module 120, the private IP address of the media gateway module 150 and the private IP address of the virtual interface 140. For the SIP signaling message, the SIP-ALG module 130 corrects and reconstructs an SDP part such that the SIP signaling gateway module 120 processes the SIP signaling message. For an RTP packet including voice data, the SIP-ALG module 130 corrects and reconstructs the SDP part such that the media gateway module 150 processes the RTP packet.

That is, the SIP-ALG module 130 acquires the unique private IP address of the SIP signaling gateway module 120 and the unique private IP address of the media gateway module 150, corrects and processes the address information of the SDP part of the SIP signaling message based on the private IP address (second address) of the SIP signaling gateway module 120, and modifies and processes the SDP part of the RTP packet based on the private IP address (third address) of the media gateway module 150.

Figure 5:
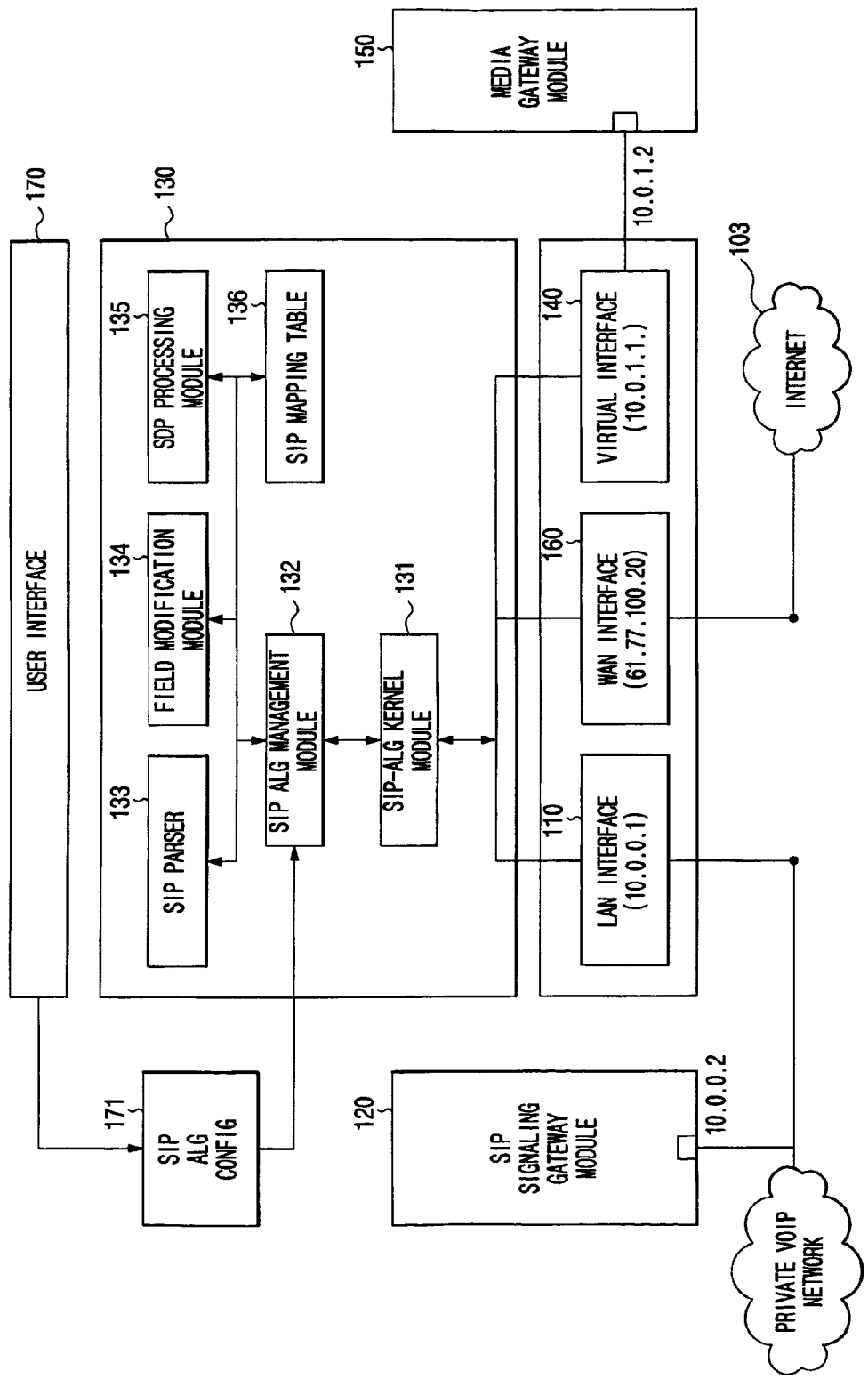
FIG. 5 is a block diagram illustrating a function of the SIP-ALG module of the integrated Internet telephony system shown in FIG. 4.

FIG. 5 is a block diagram illustrating a function of the SIP-ALG module of the integrated Internet telephony system 100 shown in FIG. 4.

Referring to FIG. 5, the integrated Internet telephony system 100 includes the SIP signaling gateway module 120, the media gateway module 150, the SIP-ALG module 130, the LAN interface 110, the WAN interface 160 and the virtual interface 140. The SIP signaling gateway module 120 is connected to the LAN interface 110 to transmit/receive a SIP signaling message, and the media gateway module 150 is connected to the virtual interface 140 to transmit/receive an RTP packet.

Like the construction shown in FIG. 4, the integrated Internet telephony system 100 includes three interfaces in a network device layer, the three interfaces corresponding to a LAN interface 110, a WAN interface 160 and a virtual interface 140. IP addresses (e.g., 10.0.0.1, 61.77.100.20 and 10.0.1.1) used by the respective interfaces are respectively allocated.

The integrated Internet telephony system 100 further includes a user interface 170, such that network operator can set a network policy through the user interface 170. The network policy is stored in a SIP-ALG Config 171, and is then sent from the SIP-ALG Config 171 to a SIP-ALG management module 132.

The SIP-ALG module 130 includes a SIP-ALG kernel module 131, the SIP-ALG management module 132, a SIP parser 133, a field modification module 134, an SDP processing module 135 and a SIP mapping table 136.

The SIP-ALG kernel module 131 binds a SIP signaling message through the LAN interface 110 and the WAN interface 160.

The SIP-ALG management module 132 performs ALG processing on the SIP signaling message, bound by the SIP-ALG kernel module 131, using the SIP parser 133, the field modification module 134, the SDP processing module 135 and the SIP mapping table 136.

Firstly, the SIP parser 133 acts to parse the SIP signaling message that the SIP-ALG module 130 received.

For example, it is determined whether or not the SIP signaling message, inputted for parsing by the SIP parser 133, is inbound or outbound, and an IP address, port information and the like are extracted from a header field or a payload of the SIP signaling message.

The field modification module 134 functions to modify header field values of the SIP signaling message using the information of the SIP mapping table 136.

In particular, the field modification module 134 modifies a private IP address into a public IP address in a source IP address field or a destination IP address field of an IP header of the SIP signaling message.

Further, the field modification module 134 performs a reverse function to modify the public IP address to the private IP address, and functions to modify the port field value of the IP header of the SIP signaling message.

The SDP processing module 135 modifies values, included in the SDP part of the SIP signaling message, using the information of the SIP mapping table 136. The modification of the values in the SDP part is also for the purpose of transmitting/receiving the SIP signaling message between the external SIP terminal and the internal SIP terminal.

The SDP processing module 135 modifies (corrects) the IP addresses of the internal and external SIP terminals, included in the SDP part of the SIP signaling message, by mapping IP addresses, respectively, by referring to the SIP mapping table 136.

A detailed description of the modification of address information on the SDP part of the SIP signaling message will be described later.

The SIP mapping table 136 includes network address translation (NAT) information for the mapping of an inbound or outbound packet.

The information in the SIP mapping table 136 includes addresses and ports of external SIP terminals and addresses and ports of internal SIP terminals. The structure of the SIP mapping table 136 will be described later.

Figure 6:
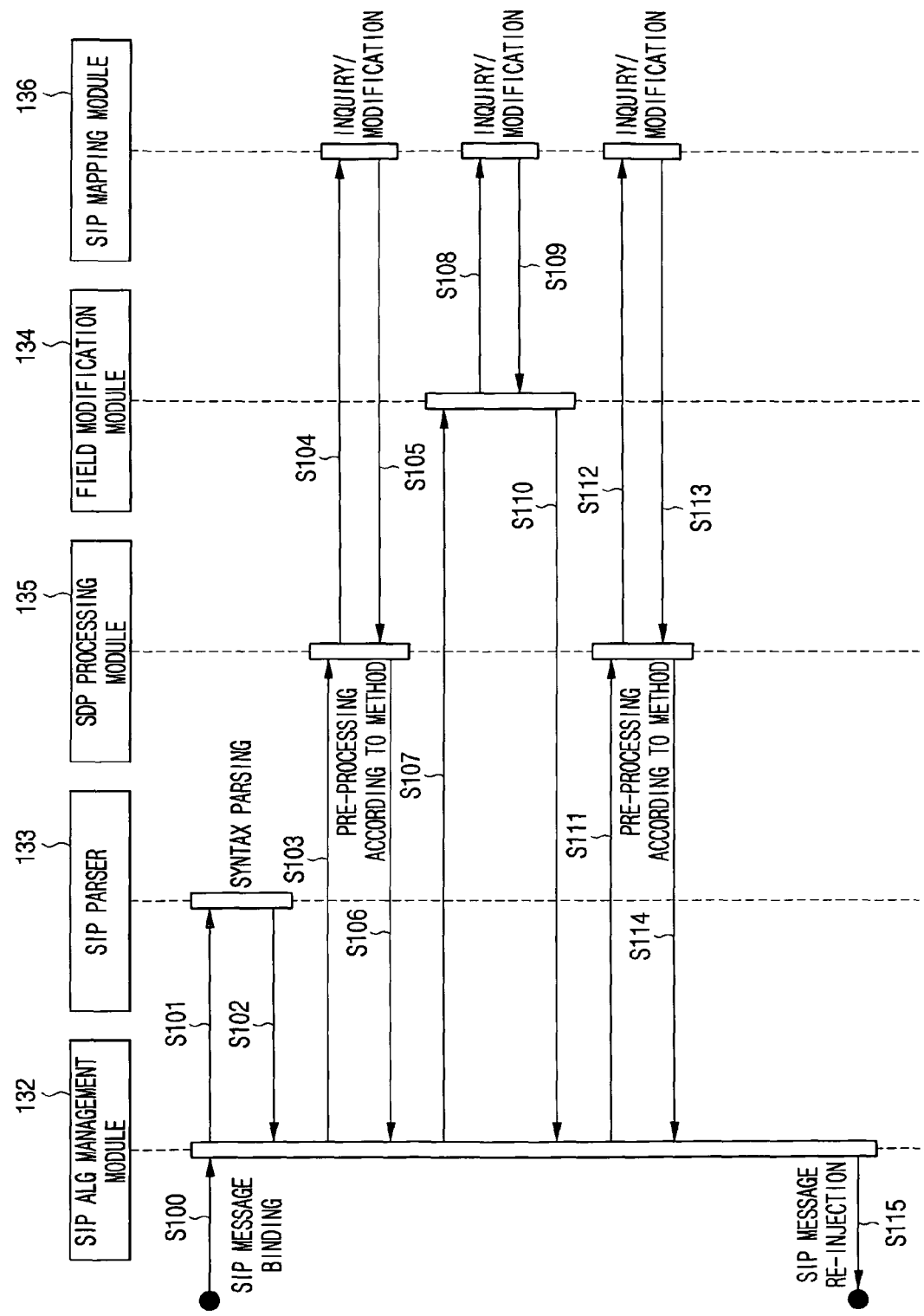
FIG. 6 is a flow diagram illustrating a method of processing SIP signaling messages in the integrated Internet telephony system according to an embodiment of the invention.

FIG. 6 is a flow diagram illustrating a method of processing SIP signaling messages in the integrated Internet telephony system according to an embodiment of the invention.

Referring to FIG. 6, the SIP ALG management module 132 binds a SIP signaling message received by the 5060 port, which is a port for transmitting/receiving a typical SIP signaling message (S100).

The SIP-ALG management module 132 sends the bound SIP signaling message to the SIP parser 133, such that the SIP parser 133 parses the SIP signaling message, particularly, the syntax of the SIP signaling message (S101).

The SIP parser 133 extracts a source address field, a destination address field and port values from the SIP signaling message, and sends the extracted fields and values to the SIP-ALG management module 132 (S102).

The SIP-ALG management module 132 sends the information of the parsed SIP signaling message to the SDP processing module 135 (S103), and the SDP processing module 135 corrects the SDP part by referring to the SIP mapping table 136 (S104, S105).

The SDP processing module 135 transmits the SIP signaling message including the corrected SDP part to the SIP-ALG management module 132 (S106).

The SIP-ALG management module 132 transmits the information, parsed from the bound SIP signaling message, to the field modification module 134 (S107), the field modification module 134 corrects field values by referring to the SIP mapping table 136 (S108, S109) and transmits the modified field values to the SIP-ALG management module 132 (S110).

According to the method of the bound SIP signaling message, the SIP-ALG management module 132 causes the SDP part values of the same SIP signaling message to be corrected (S111, S112, S113 and S114).

The SIP-ALG management module 132 re-injects the SIP signaling message, with the SDP part thereof corrected in the SDP processing module 135 and the field values thereof modified in the field modification module 134, and particularly, transmits the SIP signaling message to the internal or external SIP agent (S115).

The SDP processing module 135 corrects address information on a call session, set to the SDP part of the SIP signaling message, by referring to the SIP mapping table 136, such that the external and internal SIP agents can transmit/receive an RTP packet through the actual call session. The field modification module 134 can correct the source address information and the destination address information of the IP header of the SIP signaling message into a mapping private or public IP address.

If the bound SIP signaling message is a SIP signaling message related to the initial call session setup, the SDP processing module 135 adds information on a transmitting/receiving SIP terminal existing in the SDP part of the SIP signaling message to the SIP mapping table 136. That is, the SDP processing module 135 allocates a NAT entry to the SIP mapping table 136 at a time when a new call session is set up, and cancels the NAT entry at a time when the call session is terminated.

This method of managing the SIP mapping table 136 according to the setting-up and the cancellation of the call session is a method that dynamically manages the SIP mapping table 136 in order to reinforce the security of the private VoIP network.

While the SIP mapping table 136 of the invention can be statically managed, it is more preferable to dynamically manage the SIP mapping table 136 since static management is comparable to forming a pin-hole in the firewall, which promotes information leakage.

Further, the SDP processing module 135 can update NAT information by allocating or cancelling an entry of the SIP mapping table 136 through a pseudo character device.

The SDP processing module 135 can also perform an aging function on the NAT information using a contract destroy callback function.

The SDP processing module 135 and the field modification module 134 modify the private IP address and port of the SIP signaling message into a public IP address and port or vice versa using the NAT information of the SIP mapping table 136.

For example, the field modification module 134 modifies the private IP address and SIP port information of a source terminal, in a header of an outgoing SIP signaling message (from inside to outside), into a public IP address and SIP port information, and also modifies the public IP address and SIP port of a destination terminal, in a header of an incoming SIP signaling message (from outside to inside), into the private IP address and SIP port of an internal SIP agent of the destination terminal.

The SDP processing module 135 modifies the private IP address and SIP port information of a source terminal, included in an SDP part of an outgoing SIP signaling message, into a public IP address and SIP port, and also modifies the public IP address and SIP portion information of a destination terminal, included in an SDP part of an incoming SIP signaling message, into the private IP address and SIP port of the destination terminal.

Accordingly, the internal SIP terminal and the external SIP terminal exchange the RTP packet including voice data through a call session, based on the address information (IP address and port information) included in the SDP part of the signaling message.

Figure 7A:
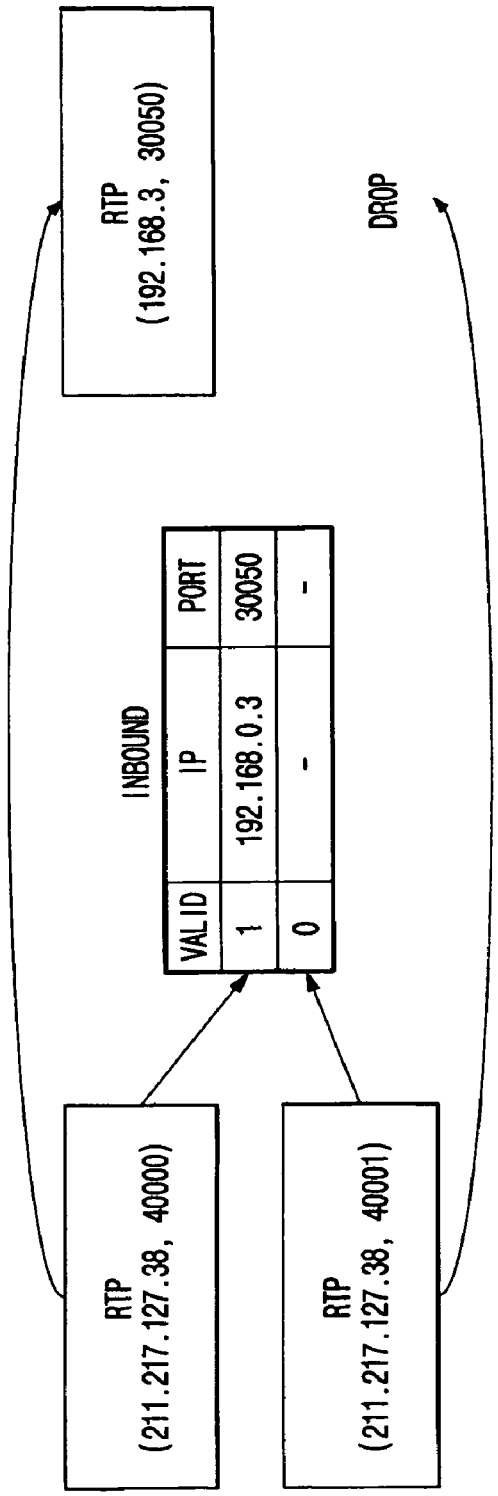
Figure 7B:
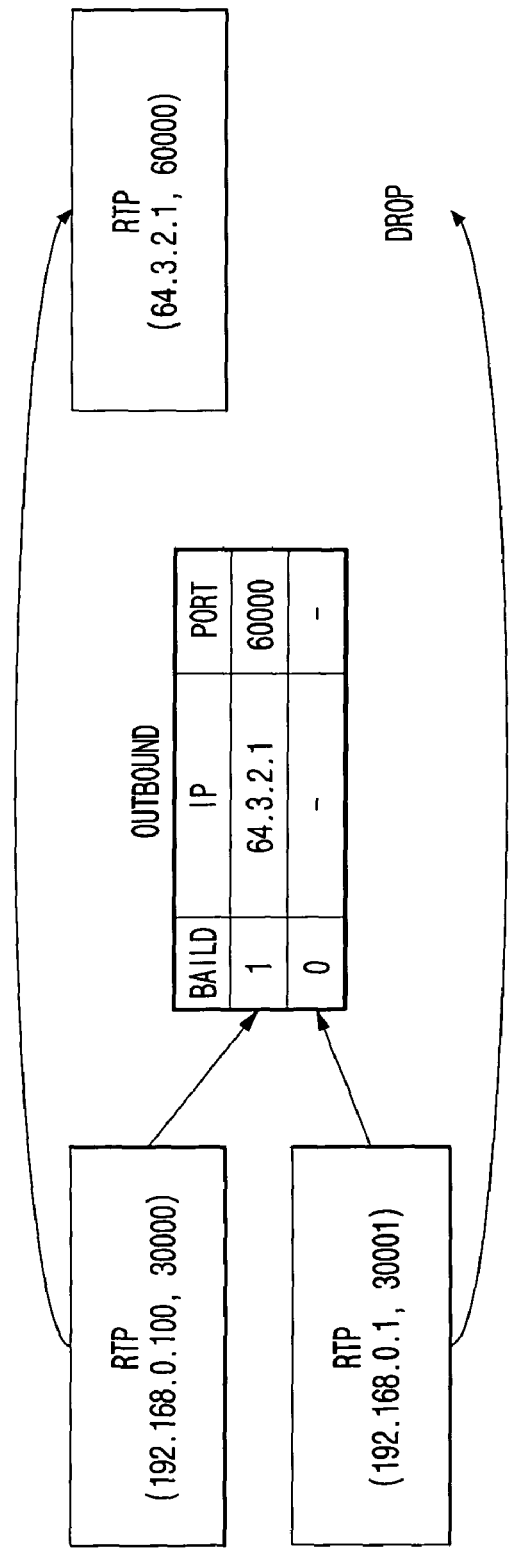

FIGS. 7A and 7B are SIP mapping tables of the integrated Internet telephony system according to an embodiment of the invention, in which FIG. 7A shows an inbound mapping table and FIG. 7B shows an outbound mapping table.

As shown in FIGS. 7A and 7B, each of the inbound mapping table and the outbound mapping table can be composed of a validity field, an IP address field and a port information field.

As seen from FIG. 7A, the syntax "# iptables-t nat-A PREROUTING-p udp-d 211.217.127.38—dport 40000:50000-j SIP_ALG—dir=inbound" defines that NAT be performed on an RTP (UDP) packet based on inbound table information, in which the RTP (UDP) packet is received with a destination port from 40000 to 50000 of the external IP address 211.217.127.38 of the integrated Internet telephony system.

Here, the external IP address of the integrated Internet telephony system 100 having the SIP mapping table 136 of FIGS. 7A and 7B is given to be 211.217.127.38.

After the session is set up through the syntax above, when an RTP packet from outside is received through the UDP 40000 port of the address 211.217.127.38, the integrated Internet telephony system 100 searches an entry with an IP address 211.217.127.38 and port information 4000. In FIG. 7A, as the result of the search, it is assumed that an entry in the second row be mapped.

Based on the information of the searched mapping table entry, the integrated Internet telephony system 100 modifies the destination IP address of the RTP packet from 211.217.127.38 into 192.168.0.3, and the port value from 40000 into 30050. The RTP packet modified as such is sent to the internal SIP terminal through the VoIP network.

Conversely, in the case of FIG. 7B, the syntax "#iptables-t nat-A PREROUTING-p udp-d 192.168.0.1—dport 30000:40000-j SIP_ALG—dir=outbound" defines that NAT is performed on an RTP packet based on outbound table information, in which the RTP packet is received by a port from 30000 to 40000 of the LAN IP address 192.168.0.1 of the integrated Internet telephony system 100.

In this set-up state, when an internal SIP terminal having a private IP address 192.168.0.100 transmits an RTP packet through a UDP 3000 port, the default gateway address of the internal SIP terminal of the integrated Internet telephony system 100 is 192.168.0.1, and thus the RTP packet is routed based on outbound table information of the integrated Internet telephony system 100.

The integrated Internet telephony system 100 searches for an entry, in which a source terminal has IP address 192.168.0.100 and port information 30000. In FIG. 7B, it is assumed that the entry existing in the second row of the outbound mapping table be mapped as the result of the searching.

Based on the searched information of the mapping table entry, the integrated Internet telephony system 100 modifies the source IP address of the RTP packet from 192.168.0.100 to 64.3.2.1, and the port value from 30000 to 60000. The RTP packet modified as above is sent through the Internet to the external SIP terminal.

That is, the SIP-ALG module 130 of the integrated Internet telephony system 100 modifies the SDP part and header field values of the outgoing SIP signaling message and the incoming SIP signaling message, such that the SIP signaling gateway module 120 processes the SIP signaling messages. At the same time, the SIP-ALG module 130 manages the outbound IP address and port information and the inbound IP address and port information of the RTP packets including voice data using the outbound mapping table and the inbound mapping table, in which the RTP packets are exchanged through the call session that is set up through the SIP signaling messages.

The SIP-ALG module 130 modifies the IP address and port information of the RTP packets exchanged through the call session, such that the RTP packets are processed by the media gateway module 150 and thus are actually exchanged between the SIP terminals.

Figure 8:
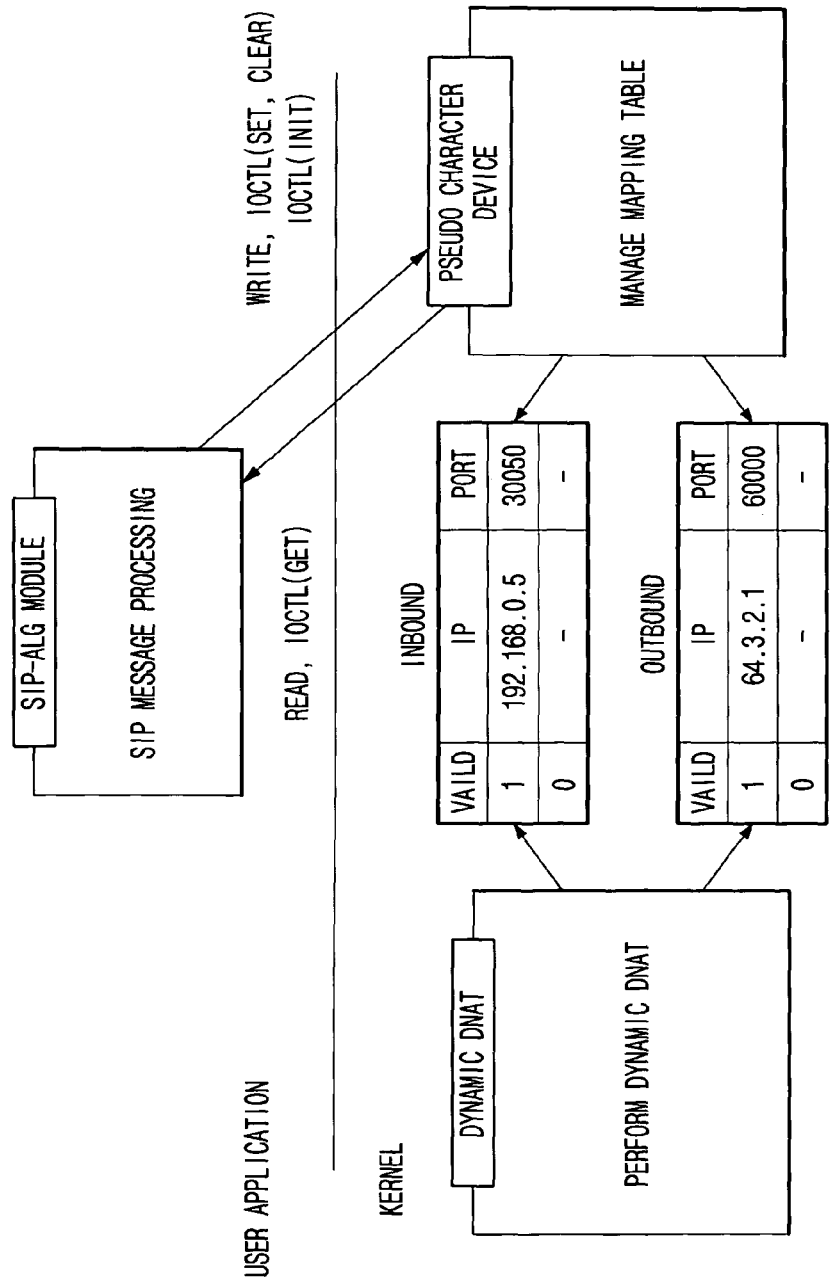
FIG. 8 illustrates a method in which a SIP-ALG module of an embodiment of the invention manages the outbound mapping table and the inbound mapping table.

FIG. 8 illustrates a method in which the SIP-ALG module of the invention manages the outbound mapping table and the inbound mapping table.

Referring to FIG. 8, the SIP-ALG module 130 manages IP address and port information of an internal SIP terminal, included in an SDP part of an outgoing SIP signaling message, while processing an SDP part of a SIP signaling message bound at a kernel. The SIP-ALG module 130 also manages IP address and port information of an external SIP terminal through a mapping table while processing an SDP part of an incoming SIP signaling message.

That is, the SIP-ALG module 130 extracts IP address and port information of internal and external SIP terminals from the SDP part of the SIP signaling message and manages the extracted IP address and port information.

As seen from FIGS. 7A and 7B, the SIP-ALG module 130 corrects IP address and port information of an RTP packet, received from the internal SIP terminal, by referring to the outbound mapping table, and corrects IP address and port information of an RTP packet received from the external SIP terminal by referring to an inbound mapping table.

The SIP-ALG module 130 dynamically manages the SIP mapping table 136 by allocating/cancelling an entry to/from the SIP mapping table 136 through a pseudo character device. For example, the SIP-ALG module 130 can allocate/delete or write/read an entry value of the SIP mapping table 136 through a write function and an input-output control (IOCTL) function.

Hereinafter, flows of a SIP signaling message in the integrated Internet telephony system of the invention will be described by way of example.

FIGS. 9A to 9F are conceptual views illustrating SIP signaling message flows in the integrated Internet telephony system according to an embodiment of the invention.

Figure 9A:
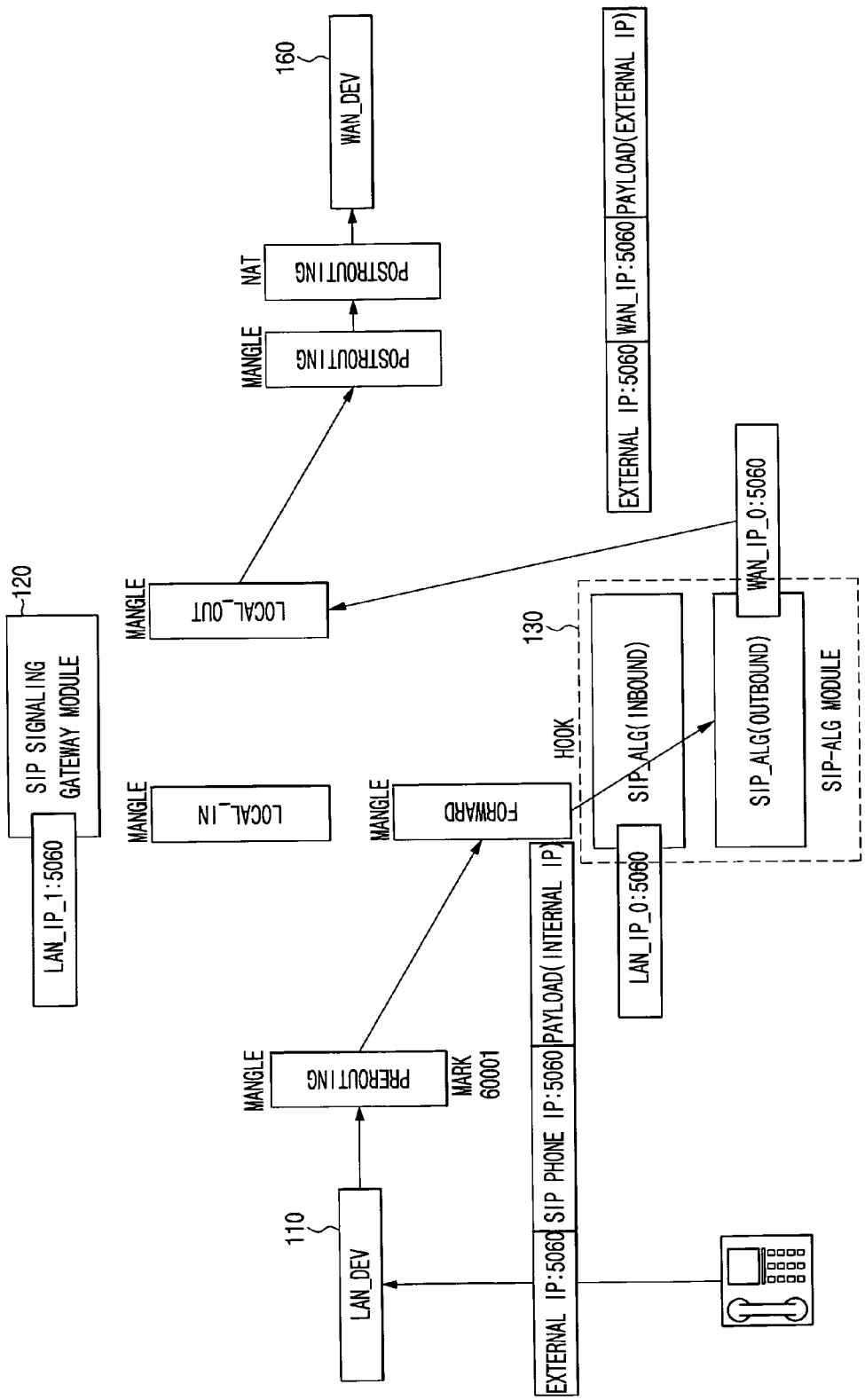

FIG. 9A shows a message flow in which a SIP signaling message is transmitted from the internal SIP terminal to the external SIP terminal of the private VoIP network. As shown in FIG. 9A, the internal SIP terminal generates the SIP signaling message (e.g., a call request message), in which the destination address information in the header area of the SIP signaling message is set to the IP address and port information (e.g., 6060) of the external SIP terminal, and the source address information in the header area of the SIP signaling message is set to the address information and port information of the internal SIP terminal, and the private IP address of the internal SIP terminal is included in a payload field.

The LAN interface 110 receives the SIP signaling message from the internal terminal and forwards the received SIP signaling message to the SIP-ALG module 130. A block of the SIP-ALG module 130, managing an outbound SIP signaling message, modifies the destination address information to the IP address information of the LAN interface 110 (PRE- ROUTING) and to the IP address information (public IP address) of the WAN interface 160 of the integrated Internet telephony system 100, and modifies the IP address of the internal SIP terminal in the payload field to the external IP address (public IP address).

The SIP-ALG module 130 modifies the internal IP address in the payload field to correspond to the external IP address while modifying the destination and source address information of the SIP signaling message, received from the internal SIP terminal, based on the SIP mapping table 136, such that the internal SIP terminal and the external SIP terminal can set the destination and source address information of their own RTP packets and exchange the set destination and source address information with each other.

Figure 9B:
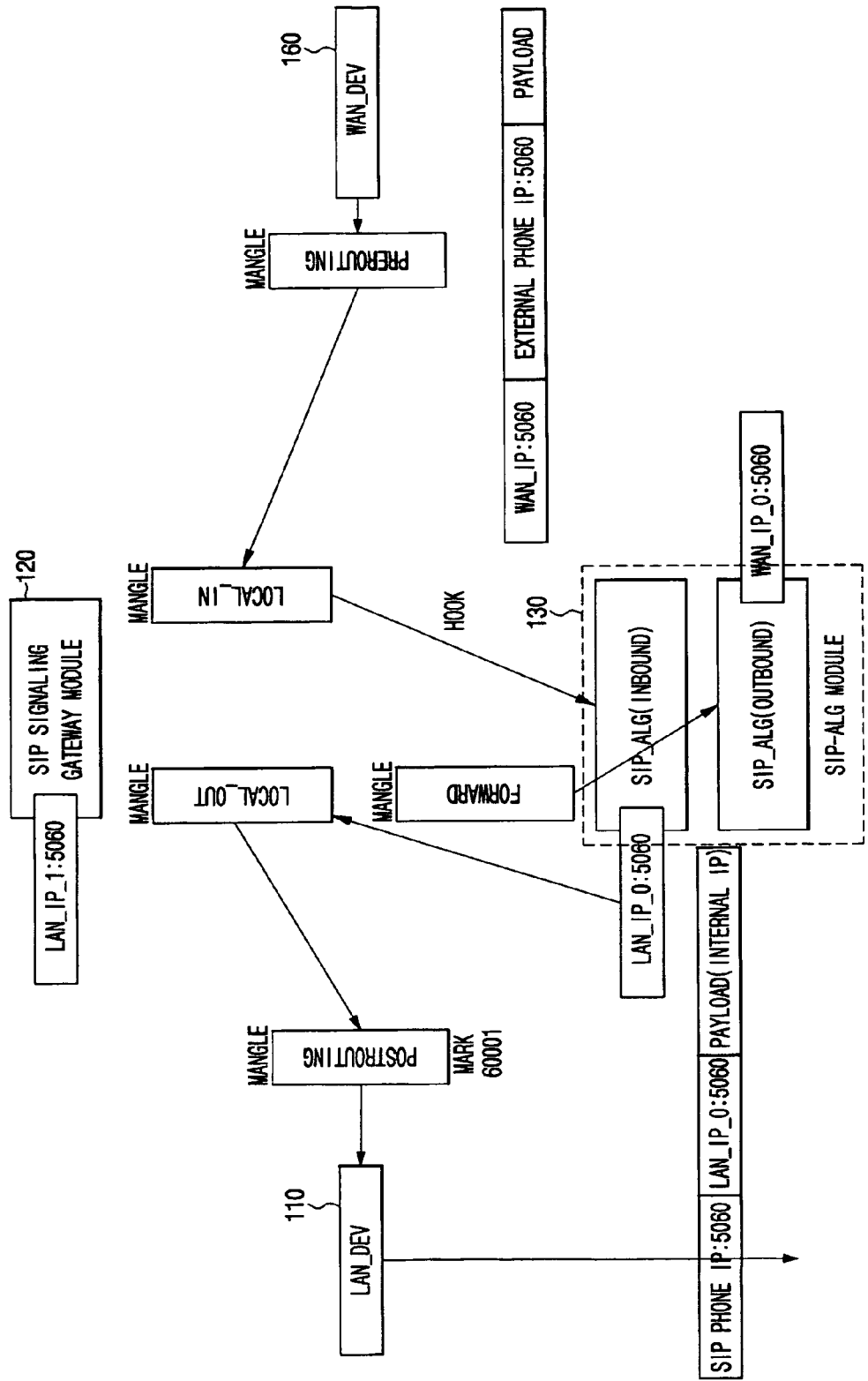

FIG. 9B shows a message flow in which a SIP signaling message is transmitted from the external SIP terminal to the internal SIP terminal. As shown in FIG. 9B, the external SIP terminal generates the SIP signaling message (e.g., a call request message), in which destination address information in the header area of the SIP signaling message is set with the public IP address and port information (e.g., 5060) of the WAN interface 160 of the integrated Internet telephony system 100, and source address information is set with the IP address information and port information of the external SIP terminal.

The external SIP terminal sets the public IP address of the WAN interface 160, which is the public IP address of the internal SIP terminal, as the destination address information since it is not notified of the internal IP address (private IP address) of the internal SIP terminal.

The WAN interface 160 receives the SIP signaling message from the external SIP terminal and sends the received SIP signaling message to a block of the SIP-ALG module 130, which manages inbound SIP signaling messages. The SIP-ALG module 130 modifies the destination address information from the IP address information of the WAN interface 160 to the IP address information of the LAN interface 110 (i.e., from the public IP address to the private IP address), modifies the source address information from the address information of the external SIP terminal to the IP address information of the LAN interface 110, and transmits the SIP signaling message with the modified source and destination address information to the internal SIP terminal (PRE-ROUTING).

That is, the SIP-ALG module 130 modifies the destination and source address information of the SIP signaling message received from the external SIP terminal based on the SIP mapping table 136, such that the internal SIP terminal and the external SIP terminal can set the destination and source address information of their own RTP packets and exchange the set destination and source address information with each other.

Figure 9C:
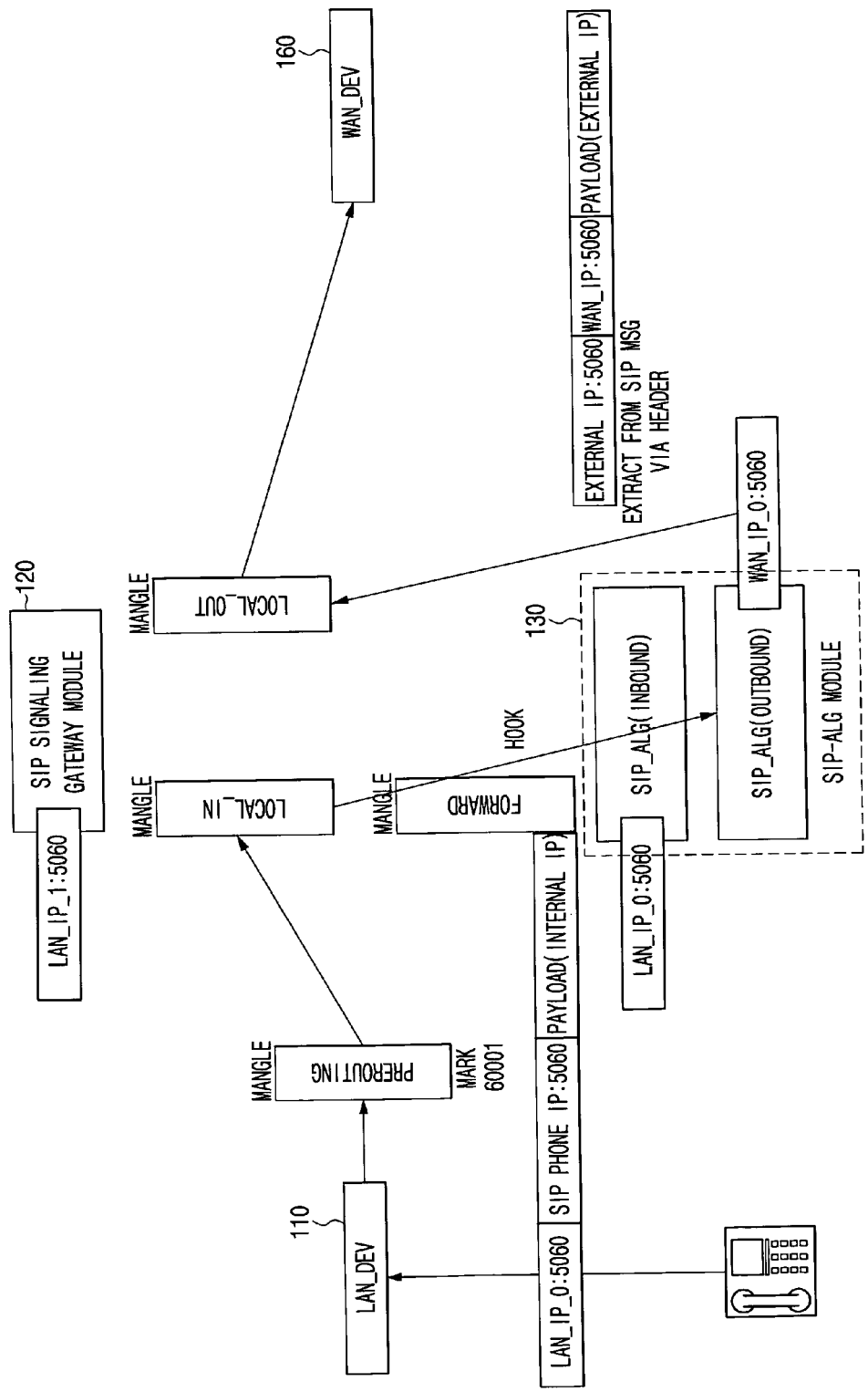

FIG. 9C shows a message flow in which the internal SIP terminal transmits a SIP response message in response to an SIP signaling message received from the external SIP terminal. As shown in FIG. 9C, the internal SIP terminal transmits the SIP response message (e.g., a call response message) in response to the SIP signaling message (e.g., a call request message) received from the external SIP terminal. Here, the destination address information of the SIP response message is set with the private IP address and port information of the LAN interface 110, the source information is set with the IP address information and port information of the internal SIP terminal, and a payload field includes the internal IP address of the internal SIP terminal (i.e., the private IP address of the internal SIP terminal).

The SIP-ALG module 130 modifies the destination address information of the SIP response message, forwarded through the LAN interface 110, to the IP address information and port information of the external SIP terminal, extracted from the header of the SIP signaling message received from the external SIP terminal. The SIP-ALG module 130 also modifies the source address information to the IP address and port information of the WAN interface 160, and modifies the internal IP address in the payload field into an external IP address, so as to transmit the forwarded SIP response message to the external SIP terminal through the WAN interface 160.

Accordingly, the internal SIP terminal and the external SIP terminal can exchange RTP packets through the integrated Internet telephony system 100. In addition, the internal SIP terminal and the external SIP terminal can substantially exchange RTP packets by setting the destination address and source address of the RTP packets with the address information extracted from the header of the SIP signaling message and the address information included in the payload.

Figure 9D:
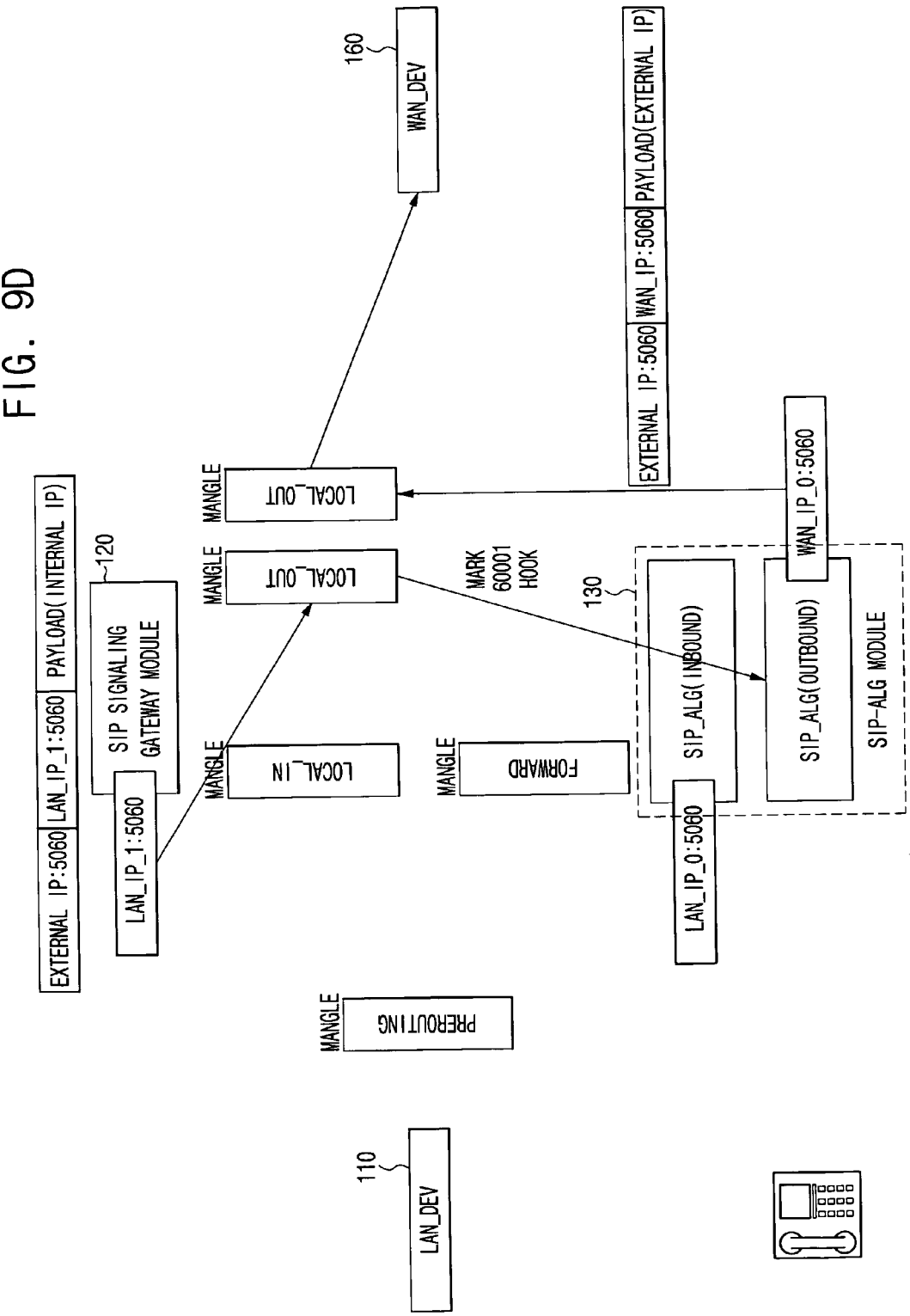

FIG. 9D shows a message flow in which the SIP signaling gateway module 120 of the integrated Internet telephony system 100 transmits a SIP response message to the external SIP terminal, FIG. 9E shows a message flow in which a SIP signaling message is transmitted from the external SIP terminal to the SIP signaling gateway module 120, and FIG. 9F shows a message flow in which the SIP signaling gateway module 120 transmits a SIP response message in response to the SIP signaling message received from the external SIP terminal.

Referring to FIGS. 9D to 9F, the SIP signaling gateway module 120 is connected to the LAN interface 110, and transmits the SIP signaling message by setting the source address information of the SIP signaling message to the address information of the LAN interface 110, setting the address information of the external SIP terminal in the destination address information, and including the internal IP address information in a payload field.

The SIP-ALG module 130 modifies the internal IP address in the payload with the external IP address while modifying the source address information of the SIP signaling message, received from the SIP signaling gateway module 120, with the address information of the WAN interface 160.

In the meantime, the SIP-ALG module 130 modifies the source address information of the SIP signaling message, received from the external SIP terminal, to the address information of the LAN interface 110 so as to be received by the SIP signaling gateway module 120.

Further, the SIP-ALG module 130 modifies the destination address information of the SIP response message, generated by the SIP signaling gateway module 120, from the address information of the LAN interface 110 to the external IP address and port information extracted from the header of the SIP signaling message, received from the external SIP terminal, and modifies the internal IP address included in the payload to the external IP address before transmitting the SIP response message through the WAN interface 160.

Hereinafter, a description will be given of an address processing method of the integrated Internet telephony system 100 according to an embodiment of the invention.

Firstly, in the integrated Internet telephony system 100, the SIP-ALG function, the SIP signaling gateway function and the media gateway function are integrated, such that the SIP signaling gateway module 120 uses the second address, which is aliased from the primary IP address (the first address) that the SIP-ALG module 130 uses.

The SIP-ALG module 130 binds the SIP signaling message to the first address (the primary IP address), and the SIP signaling gateway module 120 binds the SIP signaling message to the aliased second address.

In the integrated Internet telephony system 100, the virtual interface 140 is also provided in addition to the LAN interface 110 connected to the private VoIP network (the internal network) and the WAN interface 160 connected to the Internet (the external network).

The private IP address of the virtual interface 140 can be set based on the private IP address of the LAN interface 110. For example, when the private IP address of the LAN interface 110 is 10.0.0.1, the private IP address of the virtual interface 140 can be set to 10.0.1.1.

The integrated Internet telephony system 100 allows the media gateway module 150 to use the third address aliased from the private IP address of the virtual interface 140.

The SIP-ALG module 130 of the integrated Internet telephony system 100 acquires the second address (e.g., 10.0.0.2) that the SIP signaling gateway module 120 uses and the third address (e.g., 10.0.1.2) that the media gateway module 150 uses.

When the SIP signaling message is bound at the kernel, the SIP-ALG module 130 corrects the SDP part while modifying the address and port information of the SIP signaling message, such that the SIP signaling gateway module 120 can process the SIP signaling message.

The SIP-ALG module 130 extracts a source address field, a destination address field and port values by parsing the syntax of the SIP signaling message, which is bound at the kernel, and corrects the SDP part by referring to the SIP mapping table 136.

As seen from FIGS. 9A to 9F, the SIP-ALG module 130 modifies and corrects the address and port information and the SDP part of the bound SIP signaling message, which is bound at the kernel, by referring to the SIP mapping table 136.

Accordingly, the SIP-ALG module 130 transmits the SIP signaling message to the SIP signaling gateway module 120 by modifying the address and port information of the message, such that the SIP signaling gateway module 120 can set a call session by processing the SIP signaling message.

The integrated Internet telephony system 100 manages the IP address and port information of the internal or external SIP terminal (SIP agent), included in the SIP signaling message, using the SIP mapping table 136.

As illustrated with reference to FIG. 8, the SIP-ALG module 130 of the integrated Internet telephony system 100 processes the SDP part of the SIP signaling message, which is bound at the kernel, manages the IP address and port information of the internal SIP terminal included in the SDP part of the outgoing SIP signaling message, processes the SDP part of the incoming SIP signaling message, and manages the IP address and port information of the external SIP terminal through the outbound mapping table.

When the call session is set between the internal SIP terminal and the external SIP terminal, the integrated Internet telephony system 100 modifies the address information (the IP address and port information) of the destination terminal, included in the SDP part of the SIP signaling message, such that RTP packets including voice data can be exchanged between the internal and external SIP terminals.

Accordingly, the internal and external SIP terminals can exchange the RTP packets based on the address information of the destination terminal included in the SDP part of the SIP signaling message.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A voice over Internet protocol (VoIP) network comprising:
    an integrated Internet telephony system including an application layer gateway function, a signaling processing function, and a media processing function integrated in one hardware architecture, wherein the integrated Internet telephony system is configured to:
        perform an application layer gateway (ALG) processing on a packet bound to a first address,
        process a signaling message bound to a second address to set up a call session between an external session initiation protocol (SIP) terminal connected to a public network and an internal SIP terminal connected to a private network, and
        perform a media processing on a real time protocol (RTP) packet based on a third address associated with a virtual interface, wherein the RTP packet is exchanged through the call session.

2. The VoIP network according to claim 1, wherein the integrated Internet telephony system comprises:
    a first interface connected to the public network;
    a second interface connected to the private network; and
    a third interface connected to a different network from the second interface.

3. The VoIP network according to claim 1, wherein:
    the first address is a private Internet protocol (IP) address of the second interface, the second address is in a same network as the first address, but is a different logical IP address from the first address, and
    the third address is in a same network as the third interface, but is a different logical IP address from the third interface.

4. The VoIP network according to claim 3, wherein:
    the second address is an IP address aliased from the first address; and
    the third address is an IP address aliased from an address of the third interface.

5. The VoIP network according to claim 1, wherein the integrated Internet telephony system is further configured to modify a private or public address information in a header field of the signaling message, which is bound to the first address, by mapping the public or private address information.

6. The VoIP network according to claim 5, wherein the integrated Internet telephony system is further configured to modify a destination address information of the signaling message, which is bound to the first address, to the second address.

7. The VoIP network according to claim 1, wherein the integrated Internet telephony system is further configured to manage address an information of the internal SIP terminal, included in a session description protocol (SDP) part of the signaling message, using an inbound mapping table when the signaling message is a outgoing from the private network to the public network, and manage address information of the external SIP terminal included in the SDP part of the signaling message using an outbound mapping table when the signaling message is an incoming message from the public network to the private network.

8. The VoIP network according to claim 7, wherein the integrated Internet telephony system is further configured to modify a destination address information of an RTP packet by referring to the inbound mapping table when the RTP packet is an outgoing packet from the public network, and modifies the destination address information of the RTP packet by referring to the outbound mapping table when the RTP packet is an incoming packet from the private network.

9. The VoIP network according to claim 1, wherein the internal SIP terminal or the external SIP terminal is further configured to exchange the RTP packet based on the destination address information included in the SDP part of the signaling message when the call session is set up.

10. An integrated Internet telephony system, which provides an Internet telephone service through a voice of Internet protocol (VoIP) network, comprising:
   a local area network (LAN) interface connected to a private VoIP network using a first private Internet protocol (IP) address;
   a wide area network (WAN) interface connected to a public network using a public IP address;
   a virtual interface having a virtual private IP address;
   a session initiation protocol (SIP) signaling gateway module configured to process a signaling message, which is bound to a second private IP address, so as to set up a call session;
   a media gateway module connected to the virtual interface through a third private IP address so as to process a real time protocol (RTP) packet; and
   a session initiation protocol-application layer gateway (SIP-ALG) module configured to modify a destination address information of the bound signaling message and address information included in a session description protocol (SDP) part of the bound signaling message.

11. The integrated Internet telephony system according to claim 10, wherein the SIP-ALG module is further configured to modify a destination address information of an outgoing signaling message and a private address information included in an SDP part of the outgoing signaling message to a public address information.

12. The integrated Internet telephony system according to claim 10, wherein the SIP-ALG module is further configured to modify a destination address information of an in-coming signaling message to the first private IP address, and modifies a public address information of an external SIP terminal included in the SDP part to a private address information.

13. The integrated Internet telephony system according to claim 10, wherein the SIP-ALG module includes:
   a SIP parser configured to parse the bound signaling message;
   a field modification module configured to modify an address information in an IP header of the signaling message;
   an SDP processing module configured to convert an address information in the SDP part of the signaling message; and
   a SIP mapping table configured to store an address information mapped to an address information included in the signaling message when the signaling message is an incoming or an outgoing message.

14. The integrated Internet telephony system according to claim 10, wherein:
   the second private IP address is an IP address aliased form the first private IP address, and
   the third private IP address is an IP address aliased from the virtual private IP address.

15. The integrated Internet telephony system according to claim 10, wherein the SIP-ALG module is further configured to modify a destination address information of the signaling message to the first private IP address when the signaling message is an incoming message, and modify a source address information of the incoming signaling message to the first private IP address.

16. The integrated Internet telephony system according to claim 15, wherein the SIP-ALG module is further configured to set the public IP address as a destination address information in the SDP part of the signaling message.

17. The integrated Internet telephony system according to claim 10, wherein the SIP-ALG module is further configured to modify a source address information of the signaling message to the public IP address when the signaling message is an outgoing message, and modify an address information in the SDP part to an external IP address of an external terminal.

18. A signaling method of an integrated Internet telephony system, which has a session initiation protocol-application layer gateway (SIP-ALG) function, a session initiation protocol (SIP) gateway function and a media processing function integrated in one architecture, and which includes a first interface connected to a private voice of Internet protocol (VoIP) network and a second interface connected to a public network, the method comprising:
   adding, at the integrated Internet telephony system, a virtual interface belong to a different network from a first address;
   managing, at a first module in charge of the SIP-ALG function, an address information included in a signaling message, which is bound to the first address, using a mapping table;
   modifying, at the first module, the address information of the signaling message and an address information included in a session description protocol (SDP) part of the signaling message;
   setting up, at a second module in charge of the SIP signaling gateway function, a call session based on the signaling message, which is bound to a second address; and
   exchanging, at an internal SIP terminal in the private VoIP network and an external terminal in the public network, a real time protocol (RTP) packet using a third address associated with the virtual interface.

19. The signaling method according to claim 18, further comprising: performing, at a third module in charge of the media processing function, a media processing on the RTP packet using the third address, which is connected to the virtual interface.

20. The signaling method according to claim 18, wherein the second address is an allocated address, which is aliased from the first address.

21. The signaling method according to claim 19, wherein the third address is an allocated address, which is aliased form the IP address of the virtual interface.

22. The signaling method according to claim 19, wherein managing, at the first module in charge of the SIP-ALG function, an address information included in a signaling message, which is bound to the first address, using a mapping table, comprises:
   managing a private address information of the internal SIP terminal in the SDP part of the signaling message, which is going out from the private VoIP network to the public network, using an inbound mapping table; and
   managing a public address information of the external SIP terminal in the SDP part of the signaling message, which is coming in from the public network, using an outbound mapping table.

23. The signaling method according to claim 22, wherein modifying, at the first module, an address information of the signaling message and an address information included in an SDP of the signaling message, comprises:

modifying the address information of the signaling message to correspond to a private IP address information or a public IP address information by referring to a respective one of the mapping tables.

24. The signaling method according to claim 23, wherein modifying, at the first module, an address information of the signaling message and an address information included in an SDP of the signaling message, comprises:

modifying a destination source address information and a source address information of the signaling message, which is coming in, from the public IP address to the first private IP address and from an address information of the external SIP terminal to the first private IP address by referring to the inbound mapping table, and transmitting the signaling message to the internal SIP terminal.

25. The signaling method according to claim 23, wherein modifying, at the first module, an address information of the signaling message and an address information included an SDP of the signaling message, comprises:

modifying a source address information of the SIP signaling message and a source information in a payload field of the SIP signaling message, which is going out, to the public IP address information and an external IP address of the external SIP terminal by referring to the outbound mapping table.

26. The VoIP network according to claim 2, wherein:

the first address is a private Internet protocol (IP) address of the second interface, the second address is in a same network as the first address, but is a different logical IP address from the first address, and the third address is in a same network as the third interface, but is a different logical IP address from the third interface.

* * * * *